(12) United States Patent
Radcliffe et al.

(10) Patent No.: US 11,023,949 B2
(45) Date of Patent: Jun. 1, 2021

(54) METHOD FOR DELIVERING A CUSTOM SANDWICH TO A PATRON

(71) Applicant: Creator, Inc., San Francisco, CA (US)

(72) Inventors: Paul Radcliffe, San Francisco, CA (US); David Bordow, San Francisco, CA (US); Jeff C. Jensen, San Francisco, CA (US); Steven Frehn, San Francisco, CA (US); Alexandras Vardakostas, San Francisco, CA (US); John Lawrence McDonald, Oakland, CA (US); Harry Shapiro Hawk, San Francisco, CA (US)

(73) Assignee: Creator, Inc., San Francisco, CA (US)

( * ) Notice: Subject to any disclaimer, the term of this patent is extended or adjusted under 35 U.S.C. 154(b) by 49 days.

(21) Appl. No.: 16/013,978

(22) Filed: Jun. 21, 2018

(65) Prior Publication Data

US 2019/0080384 A1    Mar. 14, 2019

Related U.S. Application Data

(63) Continuation-in-part of application No. 14/208,149, filed on Mar. 13, 2014, now Pat. No. 10,068,273.

(60) Provisional application No. 61/780,370, filed on Mar. 13, 2013.

(51) Int. Cl.
*G06Q 30/06*     (2012.01)
*G06Q 50/12*     (2012.01)

(52) U.S. Cl.
CPC ..... *G06Q 30/0631* (2013.01); *G06Q 30/0621* (2013.01); *G06Q 50/12* (2013.01)

(58) Field of Classification Search
None
See application file for complete search history.

(56) References Cited

U.S. PATENT DOCUMENTS

| 3,342,307 A | 9/1967 | Leach |
| 3,456,578 A | 7/1969 | William |
| 3,774,791 A | 11/1973 | Ulrich |

(Continued)

FOREIGN PATENT DOCUMENTS

| EP | 0296496 A2 | 12/1988 |
| WO | WO-9930257 A1 | 6/1999 |
| WO | WO-9949277 A1 | 9/1999 |

*Primary Examiner* — Allen C Chein
*Assistant Examiner* — Denisse Y Ortiz Roman
(74) *Attorney, Agent, or Firm* — Harness, Dickey & Pierce, P.L.C.

(57) ABSTRACT

A method of fulfilling custom food orders includes obtaining feedback from a user through an ordering application. The feedback relates to a first food item of a first food order following fulfillment of the first food order. The first food item includes a first ingredient. The method includes determining a preferred variation associated with the first ingredient based on the feedback and a first recipe used to make the first food item. The method includes updating a taste profile associated with the user based on the preferred variation. The method includes receiving, from the user, a second food order including a second food item. The method includes retrieving a second recipe associated with the second food item. The method includes selectively modifying the second recipe based on the taste profile. The method includes controlling a food assembly apparatus to prepare the second food item according to the second recipe.

20 Claims, 38 Drawing Sheets

(56) References Cited

U.S. PATENT DOCUMENTS

| | | | |
|---|---|---|---|
| 3,780,643 | A | 12/1973 | Papai |
| 3,887,964 | A | 6/1975 | Richards |
| 4,246,462 | A | 1/1981 | Meisel |
| 4,356,595 | A | 11/1982 | Sandberg et al. |
| 4,513,656 | A | 4/1985 | Fay |
| 4,567,819 | A | 2/1986 | Adamson |
| 4,582,047 | A | 4/1986 | Williams |
| 4,716,821 | A | 1/1988 | Mally et al. |
| 4,723,614 | A | 2/1988 | Lahti |
| 4,913,039 | A | 4/1990 | Sutphen |
| 4,944,218 | A | 7/1990 | Cresson |
| 4,949,629 | A | 8/1990 | Leary et al. |
| 4,951,648 | A | 8/1990 | Shukla et al. |
| 5,033,366 | A | 7/1991 | Sullivan |
| 5,113,753 | A | 5/1992 | Robinson |
| 5,113,754 | A | 5/1992 | Robinson et al. |
| 5,115,731 | A | 5/1992 | Maitland |
| 5,184,538 | A | 2/1993 | Ledet |
| 5,190,780 | A | 3/1993 | Fehr et al. |
| 5,306,192 | A | 4/1994 | Caveza et al. |
| 5,377,492 | A | 1/1995 | Robertson et al. |
| 5,379,633 | A | 1/1995 | Flisram et al. |
| 5,441,035 | A | 8/1995 | Liang-Chieh |
| 5,520,520 | A | 5/1996 | Nakamoto et al. |
| 5,540,943 | A | 7/1996 | Naramura |
| 5,566,817 | A | 10/1996 | Meeker |
| 5,826,496 | A | 10/1998 | Jara |
| 5,921,096 | A | 7/1999 | Warren |
| 6,026,375 | A * | 2/2000 | Hall ............... G06Q 10/08 701/533 |
| 6,032,574 | A | 3/2000 | Brayton et al. |
| 6,095,322 | A | 8/2000 | Buysman et al. |
| 6,323,462 | B1 | 11/2001 | Strand |
| 6,370,513 | B1 * | 4/2002 | Kolawa ............... G06Q 30/02 705/15 |
| 6,546,847 | B2 | 4/2003 | Pilati et al. |
| 6,696,003 | B2 | 2/2004 | Cediel et al. |
| 6,837,436 | B2 | 1/2005 | Swartz et al. |
| 6,843,166 | B1 | 1/2005 | Li |
| 6,915,734 | B2 | 7/2005 | Torghele et al. |
| 7,063,263 | B2 | 6/2006 | Swartz et al. |
| 7,160,566 | B2 | 1/2007 | Fink et al. |
| 7,216,490 | B2 | 5/2007 | Joshi |
| 7,220,944 | B2 | 5/2007 | Miller et al. |
| 7,370,749 | B2 | 5/2008 | Smith |
| 7,581,476 | B2 | 9/2009 | Freudinger et al. |
| 7,600,459 | B2 | 10/2009 | Bodey et al. |
| 7,680,690 | B1 * | 3/2010 | Catalano ............... G06Q 30/02 186/38 |
| 7,682,227 | B1 | 3/2010 | Bifulco |
| 7,828,237 | B2 | 11/2010 | Griffith et al. |
| 8,011,914 | B2 | 9/2011 | Taylor et al. |
| 8,145,854 | B1 | 3/2012 | Lee |
| 8,190,483 | B2 | 5/2012 | Woycik et al. |
| 8,276,505 | B2 | 10/2012 | Buehler |
| 8,307,951 | B2 | 11/2012 | Sus et al. |
| 8,429,026 | B1 | 4/2013 | Kolawa et al. |
| 9,911,164 | B1 * | 3/2018 | Silver ............... G06Q 10/02 |
| 2003/0200848 | A1 | 10/2003 | Kuchler |
| 2004/0045975 | A1 | 3/2004 | Leykin et al. |
| 2004/0208961 | A1 | 10/2004 | Reckert et al. |
| 2004/0238555 | A1 * | 12/2004 | Parks ............... G07F 11/70 221/80 |
| 2005/0034588 | A1 | 2/2005 | Schone et al. |
| 2005/0051566 | A1 | 3/2005 | Leykin et al. |
| 2005/0199135 | A1 | 9/2005 | Nishinomiya et al. |
| 2006/0237477 | A1 | 10/2006 | Gregg |
| 2007/0023505 | A1 | 2/2007 | Norton et al. |
| 2007/0196540 | A1 | 8/2007 | Kirksey et al. |
| 2007/0265935 | A1 | 11/2007 | Woycik et al. |
| 2008/0187637 | A1 | 8/2008 | Spiegel |
| 2008/0313046 | A1 | 12/2008 | Denenburg et al. |
| 2008/0319864 | A1 * | 12/2008 | Leet ............... G06Q 10/087 705/15 |
| 2009/0056562 | A1 | 3/2009 | Julian et al. |
| 2009/0241481 | A1 | 10/2009 | Sus et al. |
| 2011/0232440 | A1 | 9/2011 | Weber |
| 2011/0256292 | A1 | 10/2011 | Purgatorio et al. |
| 2012/0072311 | A1 | 3/2012 | Khan |
| 2012/0078734 | A1 | 3/2012 | Sus et al. |
| 2012/0179584 | A1 | 7/2012 | Woycik et al. |
| 2013/0020330 | A1 | 1/2013 | Luft et al. |
| 2013/0149679 | A1 | 6/2013 | Tokuda et al. |

\* cited by examiner

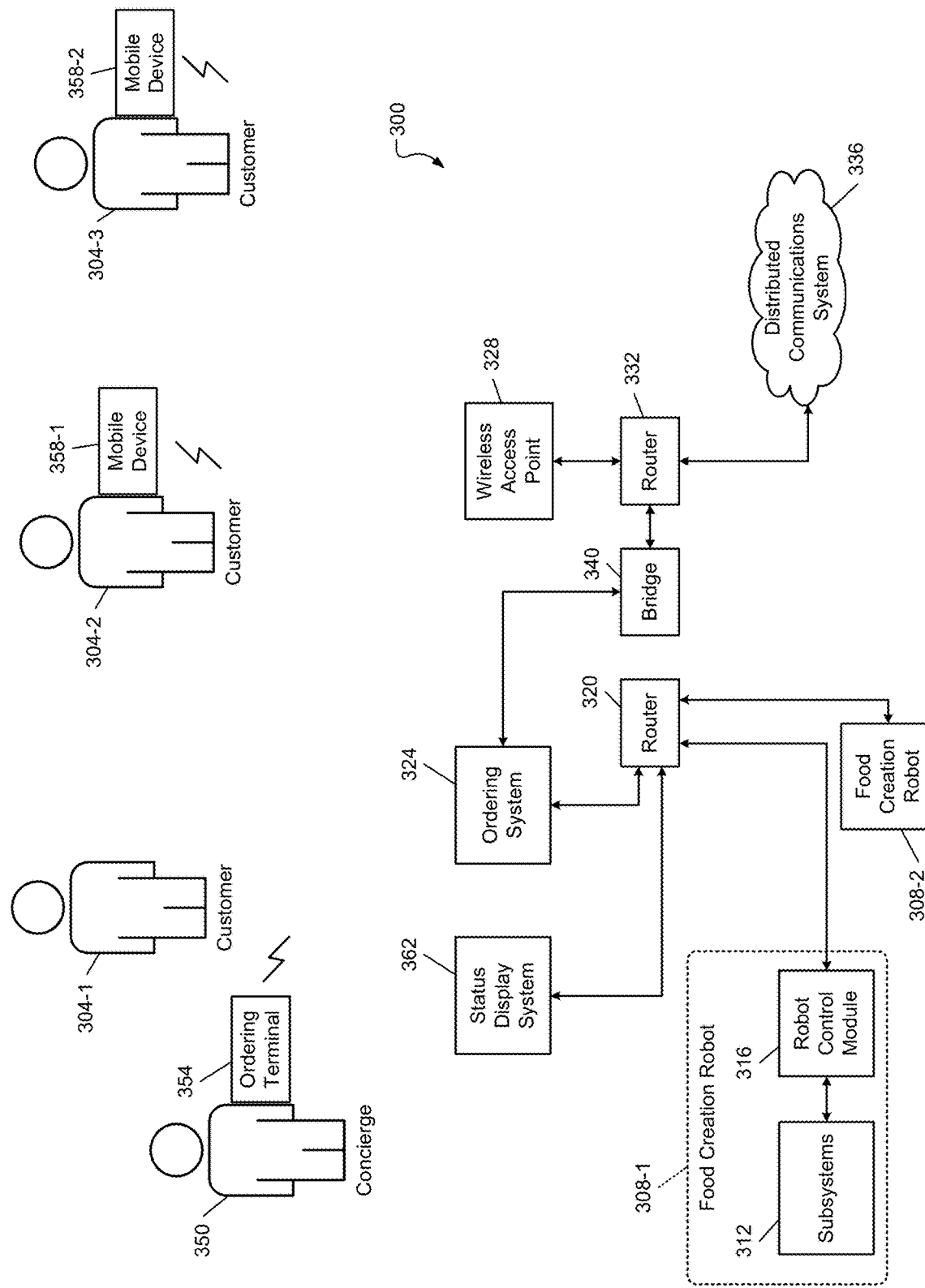

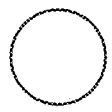 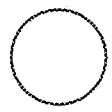 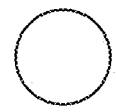 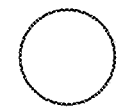 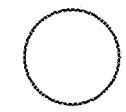 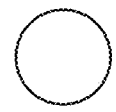 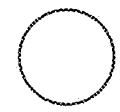
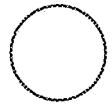 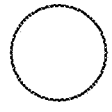 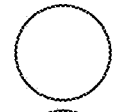    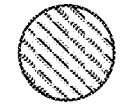
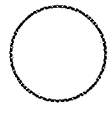      
FIG. 7A  FIG. 7B  FIG. 7C  FIG. 7D  FIG. 7E  FIG. 7F  FIG. 7G Ready for Pickup
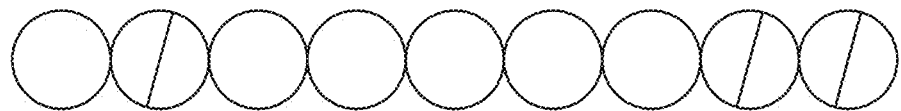
In Progress
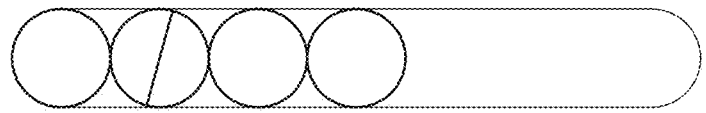
FIG. 10
Ready for Pickup
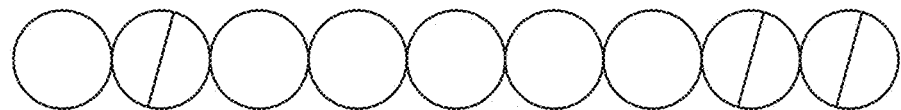
In Progress
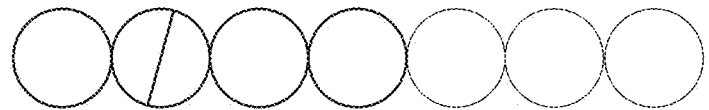
FIG. 11

METHOD FOR DELIVERING A CUSTOM SANDWICH TO A PATRON

CROSS-REFERENCE TO RELATED APPLICATIONS

This application is a continuation-in-part of U.S. patent application Ser. No. 14/208,149 filed Mar. 13, 2014, which claims the benefit of U.S. Provisional Application No. 61/780,370, filed Mar. 13, 2013. The entire disclosures of the applications referenced above are incorporated by reference.

FIELD

This invention relates generally to the field of food preparation, and more specifically to a new and useful method for delivering a custom sandwich to a patron in the field of food preparation.

BRIEF DESCRIPTION OF THE DRAWINGS

FIG. 6 is a functional block diagram of an example establishment at which a food creation robot is installed.

FIG. 7A-7G are front views of a graphical user interface for a display screen or portion thereof.

FIG. 10 is a front view of a graphical user interface for a display screen or portion thereof.

FIG. 11 is a front view of a graphical user interface for a display screen or portion thereof.

DETAILED DESCRIPTION

The following description of the embodiment of the invention is not intended to limit the invention to these embodiments, but rather to enable any person skilled in the art to make and use this invention.

Figure 1:
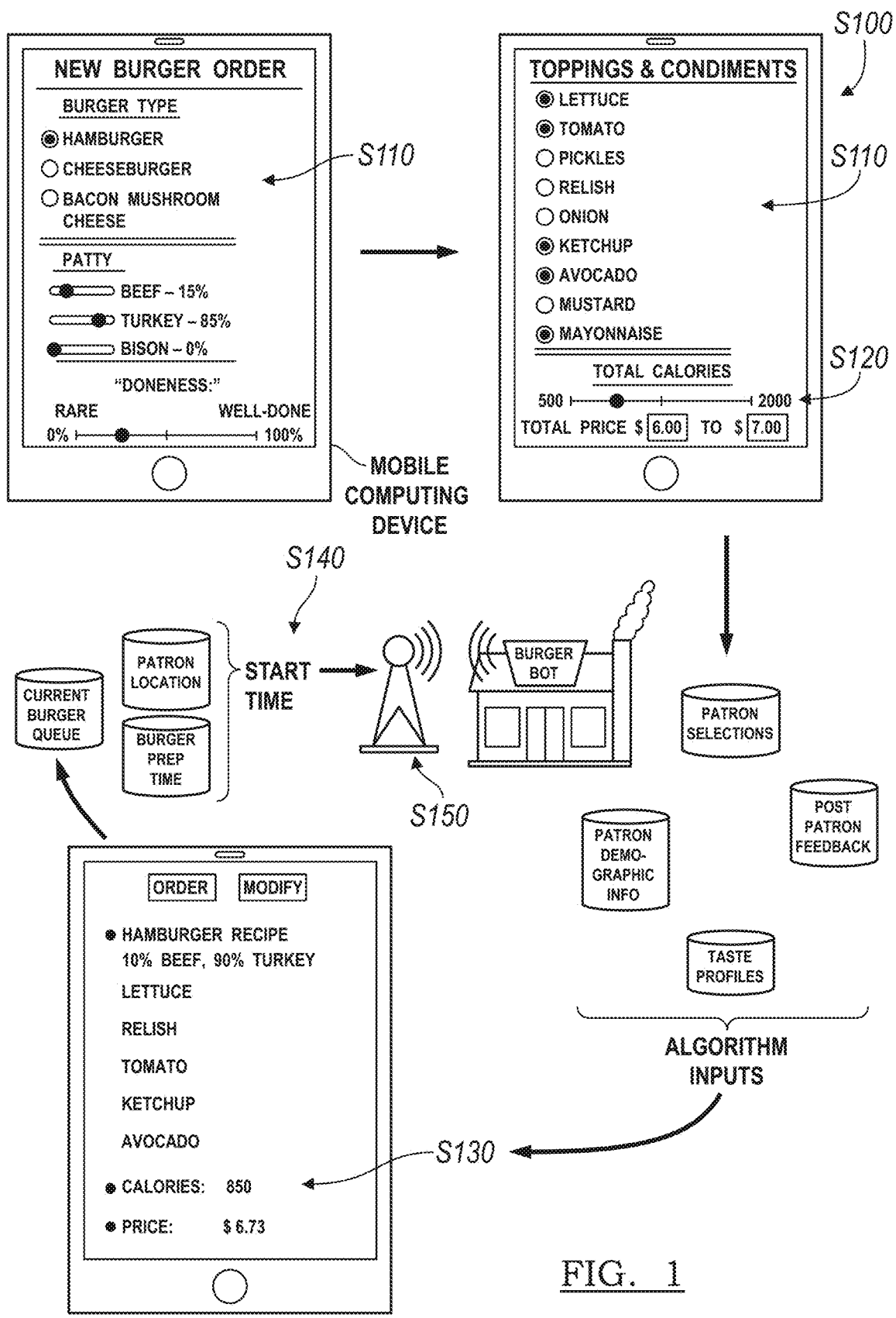
FIG. 1 is a flowchart representation of a first method of one embodiment of the invention.

As shown in FIG. 1, a method S100 for delivering a custom sandwich to a patron includes: receiving a selection for a sandwich type from a patron in Block S110; receiving, from the patron, a constraint related to the sandwich in Block S120; calculating a recipe and a cooking schedule for the sandwich based on the selected sandwich type and the constraint in Block S130; calculating a sandwich build start time based on a determined location of the user and the cooking schedule for the sandwich in Block S140; and submitting the recipe, the cooking schedule, and the sandwich build start time to a robotic sandwich assembly apparatus in Block S150.

The first method S100 functions to "optimize" flavor, timing, and a constraint for a food product according to various entered and derived factors related to a patron and to a patron's food order. From hereinafter, the first method S100 is described generally in the context of sandwiches and specifically in the context of burgers (e.g., hamburgers, cheeseburgers, veggie burgers). For example, the first method S100 can compromise a patron-elected constraint(s) (e.g., calories, nutritional content, price, or hunger level), a patron's taste preferences (e.g., based on patron feedback from a previous food order), and an order fulfillment time (e.g., based on a predicted time to complete the burger and a pickup preference of the patron) in order to generate and submit a food order to meet the patron's dietary needs. However, the first method S100 can also be applicable to any other assembled and/or prepared food such as salads, burritos, pizza, ice cream cones, banana splits, ice cream cookie sandwiches, hot dogs, deli sandwiches, falafel, gyros, layered cakes, tacos, crepes, waffles, pancakes, omelets, mixed (alcoholic or non-alcoholic) drinks, smoothies, etc.

In particular, the first method S100 functions to generate and submit a food order to a robotic sandwich assembly apparatus, such as described in U.S. Provisional Application No. 61/656,106, which was filed on 6 Jun. 2012 and which is incorporated herein in its entirety by this reference. The robotic sandwich assembly apparatus can incorporate various modules, components, sensors, control systems, etc. to enable precision fulfillment of custom burger orders, that is, accurate and repeatable assembly of burgers with custom combinations and quantities of available meats, buns, toppings, and condiments as specified through custom burger orders. For example, the robotic sandwich assembly apparatus can include a custom patty grinder that grinds fresh meats (e.g., beef, turkey, lamb, chicken, bison) and/or meat substitutes (e.g., soybeans, chickpeas, black beans) and stamps custom patties responsive to custom patty orders, such as an 8 oz. patty with 10% beef, 50% turkey, 40% bison for a first patron and a 5.5 oz. patty with 60% bison, 20% chicken, and 20% turkey for a second patron. The robotic sandwich assembly apparatus can also include a broiler or other type of patty cooker configured to cook each patty for a specific period of time and/or at a specific temperature to fulfill a custom patty "doneness" order. For example, the broiler can include a conveyor and burner for each of a general rare, medium, and well-done doneness setting, and the robotic sandwich assembly apparatus can control the speed and specific temperature of each conveyor to meet each specific doneness requirement for each burger that moves down the conveyor to cook. In another example, the broiler can include a wide, constant-speed conveyor and a series of burners that create a temperature differential across the width of the conveyor, wherein the custom patty grinder can dispense each patty at a particular location across the conveyor based on a respective doneness requirement. The robotic sandwich assembly apparatus can also include a topping dispenser and a condiment dispenser, as described in U.S. Provisional Application No. 61/656,106, configured to selectively slice and dispense fresh whole vegetables (e.g., lettuce, tomato, onion, pickle) and to selectively dispense specific quantities of condiments (e.g., mayonnaise, mustard, ketchup, relish) onto a bun. The robotic sandwich assembly apparatus can further include a bagging, boxing, or plating assembly configured to place a completed burger in a bag, in a box, on a plate, or in any other packaging for delivery to a patron. However, the robotic sandwich assembly apparatus can include any other components configured to independently or in cooperation enable precision fulfillment of custom burger orders.

Figure 2:
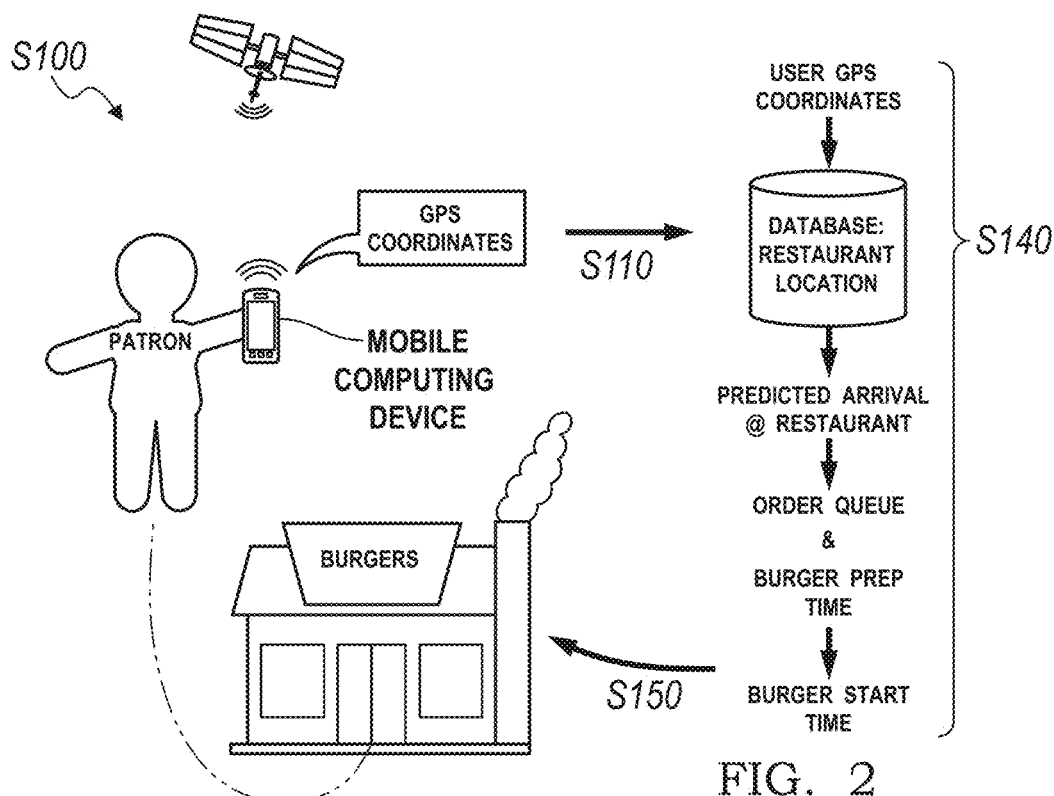
FIG. 2 is a flowchart representation of one variation of the first method.

As shown in FIGS. 1 and 2, Blocks of the first method S100 can be implemented on a mobile computing device, such as a smartphone or a tablet. Blocks of the first method S100 can thus receive order information, patron (GPS) location, payment information, patron feedback, etc. through a touchscreen or other user interface on the mobile computing device. A native sandwich-ordering application executing on the mobile computing device can further implement a sandwich algorithm to effectively compromise taste, nutrition, price, hunger level, time, and/or other parameters for each sandwich order entered by the patron, and the native application can further interface with a wireless communication module to transmit a custom sandwich order to the robotic sandwich assembly apparatus either directly or through a remote server in communication with the robotic sandwich assembly apparatus. Therefore, Blocks of the first method S100 can be implemented directly on a third-party electronic device (i.e., the patron's mobile computing device) in direct or indirect communication with the robotic sandwich assembly apparatus. In this implementation, the mobile computing device can store—or access from a remote database—past orders submitted by the patron, previous patron feedback, previous payment methods, previous receipts, a social networking profile of the patron, demographic information of the patron, the patron's location, tastes or preferences common to the patron's demographic or location, etc. The mobile computing device can also function as a feedback channel for the patron to submit feedback for the current burger order once the burger has been delivered, and the mobile computing device can store this feedback and/or communicate it to a remote database where it is stored in a personal taste profile of the patron and/or added to an aggregate taste profile for multiple patrons, such as in the same region or of a similar demographic.

Figure 3:
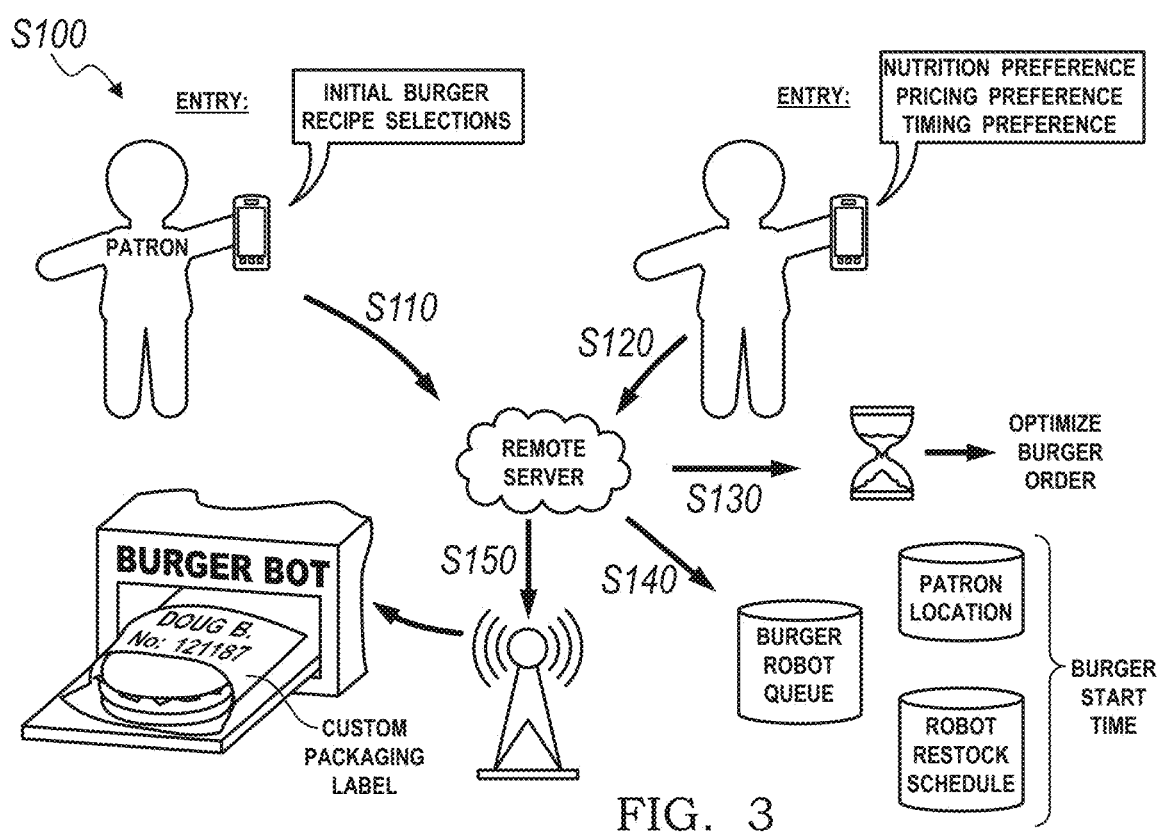
FIG. 3 is a flowchart representation of one variation of the first method.

Alternatively, as shown in FIG. 3, Blocks of the first method S100 can be implemented on a remote computer system, such as a remote server in communication with the robotic sandwich assembly apparatus (or a network of robotic sandwich assembly apparatuses) through an Internet or Ethernet connection. The computer system can be a cloud-based computer (e.g., Amazon EC2), a mainframe computer system, a grid-computer system, or any other suitable computer system. For example, the computer system can be a remote server that communicates with one or more robotic sandwich assembly apparatuses over HTTP (or TCP or UDP) protocols through a web service (e.g., Amazon AWS). The computer system can thus transmit patron, order, and/or order status data to and/or from robotic sandwich assembly apparatuses over an Ethernet, cellular, Wi-Fi, satellite, or other suitable connection.

Yet alternatively, Blocks of the first method S100 can be implemented by a user interface arranged on the robotic sandwich assembly apparatus or within a restaurant, café, or other establishment housing the robotic sandwich assembly apparatus. For example, the touchscreen can be installed on an external housing of the robotic sandwich assembly apparatus to receive ingredient selections from the patron and to display order information prior to submission to the robotic sandwich assembly apparatus. In another example, mobile computing devices can be arranged throughout the restaurant, etc., such as in tables or on walls, such that patrons can walk up to the mobile computing devices to build and submit custom burger orders. However, Blocks of the first method S100 can be implemented by any other device and in any other suitable way.

Block S110 of the first method S100 recites receiving a selection for a sandwich type from a patron. Generally, Block S110 functions to receive ingredient selections and sandwich preferences from the patron such that subsequent Blocks of the first method S100 can build and then submit a custom burger order to meet the patron's current appetite. Block S110 can also receive ingredient selections, in addition to the sandwich type selection, such as through a native application executing on a mobile computing device.

In one implementation, Block S110 receives a sandwich type selection from the patron. In one example, the patron opens a native custom burger application, initiates a new order, and selects a sandwich from a standard menu of sandwich types, such as including a plain hamburger, a cheeseburger, and a bacon and mushroom burger, as shown in FIG. 1. In another example, Block S110 filters the standard menu according to past orders submitted by the patron or perceived tastes of the patron in order to simplify the patron's selection, and the patron selects, through the native custom burger application, a type of sandwich from the limited menu. In yet another example, Block S110 receives data pertaining to "trending" custom burger orders from other patrons or common burger types selected by patrons in the same region or of a demographic similar to the patron and appends the standard menu or replaces items on the standard menu with the trending or common burger types, and the patron selects, through the native custom burger application, a type of sandwich from the modified menu. Block S110 can then retrieve the patron's selection entered into the native application.

Alternatively, Block S110 can receive a patty and bun selection from the patron. For example, the native application can display bun types (e.g., standard bun, extra-large bun, English muffin, lettuce wrap) adjacent corresponding radio buttons, and Block S110 can receive the patron's bun selection based on the state of each radio button. Block S110 can also receive a patty selection based on the state of each radio button adjacent a corresponding patty type (e.g., 100% lean beef, chicken breast, veggie burger). Alternatively and as described above, the native application can display meat types (e.g., beef, turkey, lamb, chicken, bison) adjacent linked sliders corresponding to a percentage or weight of each meat type in the patty, and Block S110 can receive a percentage or weight of each type of meat to grind for the custom patty based on the position of each slider, as shown in FIG. 1.

As shown in FIG. 1, Block S110 can further receive topping and condiment selections from the patron though the native application. For example, the native application can display a list of available toppings and condiments (e.g., cheese, tomato, lettuce, onion, mushroom, fried egg, mayonnaise, ketchup, mustard, relish, pickle, pepper, salt, BBQ sauce, jalapeños, sprouts) with corresponding adjacent radio buttons, and Block S110 can receive the patron's ingredient selection based on the state of each radio button. In another example, the native application can display the list of available toppings and condiments with corresponding adjacent sliders, each slider specifying a range, such as "none to a lot" (e.g., for ketchup or pepper) "none to 2 oz.," (e.g., for lettuce) or "none to 2 tsp." (e.g., for mayonnaise). In this example, Block S110 can receive the patron's preference for exclusion or inclusion of various ingredients as well as a preferred amount of each ingredient.

Block S110 can further control the menu of burger types, bun types, patty types, meats, toppings, and/or condiments presented to the patron for selection within the native application. For example, Block S110 can receive the patron's location from the patron's mobile computing device (e.g., GPS coordinates), identify a nearest robotic sandwich assembly apparatus, and poll the robotic sandwich assembly apparatus for buns, patties, meat, toppings, condiments, and/or other ingredients loaded into the robotic sandwich assembly apparatus and currently available. Block S110 can further access current orders and/or predicted incoming order ingredients to predict ingredient availability when the patron's order is queued to the robotic sandwich assembly apparatus. Block S110 can subsequently adjust ingredient lists displayed to the patron through the native application such that the patron has a substantially complete list of available ingredients that also excludes items not available from the target (i.e., local) robotic sandwich assembly apparatus.

Additionally or alternatively, Block S110 can automatically select all or a portion of the ingredients in the patron's new order. In one implementation, in response to an "I'm hungry," "I want a burger," or other input by the patron into the native application, Block S110 accesses a past burger order by the patron and modifies (e.g., adjusts ingredient quantities and doneness specifications) the past order according to the patron's order feedback in order to generate a selection of burger ingredients and preferences that better meets the patrons taste, nutritional, and/or other preferences. In another implementation, Block S110 accesses past patron orders, past patron order feedback, a time of day, a recent social networking communication or post, patron trends or habits, patron demographic and location, and/or any other patron or order information to generate a selection of burger ingredients and preferences particular to the patron at the particular time. In this implementation, Block S110 can thus implement a burger recommendation service to recommend particular burger ingredients and/or preferences to meet a patron's current dietary needs.

Block S120 of the first method S100 recites receiving, from the patron, a constraint related to the sandwich. Generally, Block S120 functions to receive a nutritional preference, a hunger level, a pricing preference, a timing, or another constraint from the patron such that Blocks S130 and S140 can generate a burger recipe and burger schedule that effectively compromises the patron's current hunger level, dietary needs, tastes, and burger and timing preferences. In one example, Block S120 can receive a preference for a total number of calories in the burger based on the position of a calorie slider bar set by the patron through the native application, as shown in FIG. 1. Similarly, Block S120 can receive a preference for a range of calories in the burger based on the state of a radio button with a labeled calorie range (e.g., 600-700 calories, 700-800 calories, etc.) set by the patron through the native application. Block S120 can additionally or alternatively receive a selection for a quantity (e.g., weight) of vegetables, a number of grams of carbohydrates or fat, a "greasiness," a weight or calorie ratio of vegetables to meat, or other nutritional preference through one or more radio buttons, slider bars, or other input regions displayed on the mobile computing device and set by the patron through the native application.

Block S120 can also receive a hunger level of the patron. For example, Block S120 can receive the patron's hunger level based on the position of a slider bar with extremes labeled "feels more like snack time" and "better make it a horse," the slider bar is displayed on the patron's mobile computing device and set by the patron through the native application. In this example, Block S120 can normalize the relative (i.e., non-scientific) hunger level selection based on previous patron order sizes and associated patron feedback to estimate an actual volume or weight of the burger necessary to satiate the patron. Alternatively, in a similar example, the slider bar can include sandwich weight, volume, or mass labels such that Block S120 can directly access data indicating a weight, volume, or mass of the burger necessary to satiate the patron.

Block S120 can also receive a burger or meal pricing preference, such as based on a patron-selected position of a slider bar associated with price. However, Block S120 can receive any other suitable patron-elected constraint.

Block S130 of the first method S100 recites calculating a recipe and a cooking schedule for the sandwich based on the selected nutritional content. Generally, Block S130 functions to combine selected ingredients, sandwich preferences, nutrition preferences, and hunger level into a sandwich order specifying specific quantities of particular ingredients and a specific cooking schedule that substantially effectively compromises order details provided by the patron.

As shown in FIGS. 1 and 2, Block S130 can implement an algorithm that selectively adjusts the quantity of particular ingredients and/or cooking schedules to generate the custom burger order. The algorithm can receive as inputs feedback from the patron and other customers in response to fulfilled burger orders, patron nutrition selection and/or hunger level, selected ingredients and/or ingredient quantities, patty doneness, degree of bun toasting, and/or other entered, collected, and/or extrapolated burger-related data pertaining to past burger orders and the current burger order. By weighting the various inputs, such as each ingredient selection and initial quantity, Block S130 can adjust how much of each ingredient is added to the burger and how the burger is cooked to "optimize" flavor, nutrition, and meal size for the patron. For example, Block S130 specifies an amount of meat by ¼ oz., the amount of tomato by slice of predetermined thickness, amount of table salt to the tens of milligrams, toasted bun to a percentage brownness, temperature of the patty to a single degree Fahrenheit, temperature gradient of the patty through its thickness, percentage meat composition of the patty, patty cook time to a second, etc., all of which can be implemented by the robotic sandwich assembly apparatus to precisely (i.e., accurately and repeatably) build a burger of substantially exacting weight, content, and nutrition (e.g., calories, grams of fat, sodium). Block S130 can also select the algorithm, from a set of algorithms, that is particularly relevant to the patron, such as an algorithm generated through feedback from patrons with tastes, location, and/or demographic similar to that of the patron. Alternatively, Block S130 can select the algorithm that is specific to the patron and refined over time as the patron submits additional burger orders and supplies corresponding feedback. However, Block S130 can implement a unique, common, default, or other algorithm to calculate the recipe and the cooking schedule for the burger.

Block S130 (and the algorithm) can account for the configuration of the robotic sandwich assembly apparatus and ingredients currently loaded to the robotic sandwich assembly apparatus (as described above). For example, the robotic sandwich assembly apparatus can include a topping dispenser as described in U.S. Provisional Application No. 61/656,106, wherein operation of the topping dispenser yields a topping (e.g., tomato, pickle, onion) slice of a particular thickness determined by a position of a respective slicing blade. In this example, Block S130 accounts for a step-like function of topping quantity, wherein each operation of the topping dispenser deposits a particular amount (or particular range of) topping onto the burger. In another example, the configuration of the condiment (e.g., ketchup) dispenser in the robotic sandwich assembly apparatus can enable application of a continuum of quantities of condiment onto the burger, such as no ketchup up to the current total volume of ketchup in a ketchup container loaded into the robotic sandwich assembly apparatus. In this example, Block S130 can also account for a viscosity of a condiment, a size of the bun or patty, and/or other ingredients on which the condiment is dispensed to set an upper limit on the amount of condiment that can be dispensed. In this example, Block S130 can scale the upper limit on applied condiment volume linearly with patty weight, and, for any given order, set the upper limit on applied relish volume (relatively high viscosity) higher than the upper limit on applied aioli volume (relatively low viscosity). In another example, the robotic sandwich assembly apparatus is configured to grind fresh meats into custom patties and press patties between ½ oz. and 16 oz. in size. In this example, the resolution of the meat grind for each meat type can be ±5%, and Block S130 can thus set a continuum of patty weights between 3 oz. and 16 oz. with custom meat grinds including between 10% and 100% of the available meats (e.g., 100% beef, or 10% beef, 15% buffalo, 75% turkey) for the robotic sandwich assembly apparatus.

In one implementation, Block S130 calculates initial burger nutrition (e.g., calories, grams of fat, vitamin B) from the ingredient selections, ingredient quantities, and cooking preferences (e.g., doneness) received from the patron and/or generated in Block S110. Block S130 then compares the initial burger nutrition to the nutrition setting received in Block S120. Block S130 can also calculate an initial size of the burger based on patron-entered or generated burger settings and then compare the initial burger size with the hunger level received in Block S120. If either of the foregoing comparisons indicate that misalignment between flavor and nutrition preferences and/or between burger size and hunger preferences, Block S130 can implement the foregoing algorithm to adjust the ingredient selections, ingredient quantities, and/or cooking preferences to reduce (i.e., optimize) the misalignment.

In one example, Block S110 can receive GPS coordinates of a mobile computing device used by the patron to submit an ingredient selection and burger preferences, and Block S130 can access customer feedback data in the patron's location or region to determine that customers in the patron's location are typically not able to taste less than 1tsp of mayonnaise, and are sensitive to between 1 and 2tsp of mayonnaise, and either can't discern more than 2tsp of mayonnaise or think that more than 2tsp of mayonnaise is too much. Thus, when Block S110 receives a selection for mayonnaise from the patron, Block S130 can set an upper and lower mayonnaise volume of 1tsp and 2tsp, respectively.

Furthermore, Block S130 can determine that the patron's preferred burger (or total meal) calorie content is less than a predicted total number of calories for the burger (or meal) with the patron's selected ingredients and ingredient quantities. In response, Block S130 can reduce the amount of mayonnaise to apply to the burger from an average of 1.5tsp to 1tsp and, if this does not suffice in reducing the total burger (or meal) calories, Block S130 can increase patty cook time (i.e., doneness) to reduce the grease (and calorie from fat content) of the burger. Furthermore, if the adjusted patty doneness (related to cooking time and temperate) approaches a boundary of patty doneness and the total burger calorie content is still excessive, Block S130 can reduce the total weight of the patty and/or replace a percentage of beef in the patty with a corresponding percentage of turkey, chicken, soybeans, and/or chickpeas. For example, if the patron specifies 20% done, Block S130 can set an upper limit of 30% doneness to meet the patron's nutritional preferences without substantially sacrificing the taste of the burger, which can be based on previous feedback from the patron, feedback from other customers in the patron's area, and/or feedback from other customers of a demographic or tastes similar to that of the patron. Similarly, if the patron specifies 50% beef, Block S130 can set a lower limit of 40% beef to meet the patron's nutritional preferences without substantially sacrificing taste. Additionally or alternatively, Block S130 can proportionally (e.g., linearly, exponentially) reduce mayonnaise amount, increase cook time, and/or adjust patty content.

In another example, prior feedback from the patron suggests that the patron has a strong liking for tomato and lettuce, though he exhibits a slight preference for lettuce over tomato. Furthermore, prior feedback suggests that the patron is particularly sensitive to doneness, and Block S130 can thus set a threshold change in patron-selected patty doneness to 5% rather than 10%, which is standard for customers with less sensitivity to doneness. As in the previous example, Block S130 can determine that the patron's total burger calorie selection is less than a predicted total number of calories for the burger with the patron's selected ingredients and ingredient quantities. In response, rather than increasing patty doneness, Block S130 can reduce patty size and replace a lost patty weight (before or after cooking) with lettuce and tomato at 1.3:1 ratio of lettuce to tomato based on the patron's slight preference for lettuce in order to meet the patron's taste preferences received in Block S110 and nutrition preference and hunger level received in Block S120.

In yet another example, Block S120 receives a price preference from the patron, such as a maximum burger price (e.g., $7.00) or a preferred burger price range (e.g., $5.00-$5.99), and Block S130 calculates a total burger price based on selected ingredients and ingredient quantities and compares this price to the patrons preferred price. If the total burger price exceeds the patron's price preference, Block S130 can selectively reduce the quantity of certain ingredients. For example, if beef is the most expensive meat in the robotic sandwich assembly apparatus and the patron has selected a 100% beef patty, Block S130 can replace a percentage of beef in the patty with a less expensive meat, such as turkey. This may also complement a requirement to reduce a total caloric content of the burger. Block S130 can additionally or alternatively reduce the size of the patty and replace the reduced weight of the burger with a vegetable that is less expensive by weight than cooked meat. However, Block S130 can calculate the burger recipe and specify the cooking schedule for the burger in any other way, according to any other schema or algorithm, and based on any other patron-related data.

Block S130 can further include displaying the "optimized" burger recipe to the patron on the mobile computing device. For example, Block S130 can include displaying, on a touchscreen of the mobile computing device, the quantity of each specified ingredient in the burger, the total nutritional content of the burger, the specified doneness of the patty, the toast level of the bun, the price of the burger, and/or any other relevant order information. Block S130 can further enable the patron to modify the recipe and/or cooking schedule, such as with radio buttons or slider bars, and further update in real time the nutritional content, size or weight, and/or price of the burger in response to patron modifications. Block S130 can record changes to the "optimized" recipe for application to future orders by the patron.

Block S130 can further prompt the patron to submit payment information, such as by entering credit or debit card information, swiping or capturing an image of a credit or debit card, linking to an electronic payment profile or checking account, submitting electronic or tangible gift card information, or selecting a payment source from a previous transaction. Block S130 can therefore also receive and/or authenticate a payment from the patron, and the payment can cover the price of the burger as well as any side, drink, dessert, or other food item. Additionally or alternatively, Block S130 can guide the user to make a payment at the restaurant, through the robotic sandwich assembly apparatus, or in any other way prior to receiving the burger. However, Block S130 can implement any other suitable or pertinent functionality.

Block S140 of the first method S100 recites calculating a sandwich build start time based on a determined location of the patron and the cooking schedule for the sandwich. Generally, Block S140 functions to specify a sandwich build start time such that the sandwich may be assembled, packaged, and readied for the patron at or by a particular time. Block S140 can estimate the time required to fulfill the order (e.g., to a second) based on any one or more of a patty grind and press time (e.g., based on patty size), broil time (e.g., based on a specified patty doneness), bun toast time, selected toppings and condiments and specified topping and condiment quantities, known burger-component transfer times (e.g., between broiler and topping stations), etc.

Block S140 also functions to determine the patron's location and to estimate a pickup time for the burger order based on the patron's location. For example, Block S140 can interface with the patron's mobile computing device to determine the patron's location, such as by receiving GPS coordinates from a GPS sensor integrated into the mobile computing device, triangulating the patron's position based on communication with local cellular towers, or identifying a local wireless router in communication with the mobile computing device. In an example implementation, Block S140 can determine that the patron is currently occupying the restaurant housing the robotic sandwich assembly apparatus and thus estimates the preferred pickup time to be as soon as possible. In another example implementation, Block S140 determines that the patron is outside the restaurant, such as several city blocks from the restaurant. In this example implementation, Block S140 can compare subsequent locations of the patron (based on time) to determine if the patron is walking, driving, or riding a bus to the restaurant. Based on an estimated speed and/or predicted local traffic, Block S140 can predict when the patron will arrive at the restaurant and estimate the preferred pickup time accordingly. Alternatively, Block S140 can receive a preferred pickup time entered into the native application by the patron explicitly, though Block S140 can function in any other way to determine the location of the patron and estimate a preferred order pickup time.

Block S140 can also predict a preferred order completion time based on patron preferences and/or past patron feedback. In one example, Block S140 can determine that the patron prefers piping-hot burgers based on past feedback suggesting that his burger was too cold. Based on this feedback, Block S140 can set the preferred order completion time as not before the patron enters the restaurant (and is ready to receive the burger). In a similar example, Block S140 can determine that the patron prefers cooled burgers (e.g., cooled for five minutes after completion) based on past feedback suggesting that his burger was too hot. Based on this feedback, Block S140 can set the preferred order completion time as between four and five minutes prior to the patron entering the restaurant.

As shown in FIG. 3, Block S140 can further access data pertaining to current orders in an order queue of the robotic sandwich assembly apparatus. For example, Block S140 can access estimated completion times for each order, specified order completion times relative to preferred order pickup times, and ingredients allocated for each order. Based on this data, Block S140 can also estimate restocking times for various ingredients and/or update a restocking schedule to maintain an adequate supply of ingredients to fulfill orders in the queue.

Based on the foregoing information, including the order completion time, the estimate arrival time of the patron, the preferred order completion time, the current robotic sandwich assembly apparatus queue, an ingredient restocking schedule, etc., Block S140 can thus specify an order start time substantially likely to fulfill order, patron, and robotic sandwich assembly apparatus requirements.

Alternatively, Block S140 can specify the order start time that simply indicates that the order is to be added sequentially to the current queue. Block S140 can also specify the order start time that withholds the order from the queue until all other orders in the patron's party have been submitted such that members of the patron's party can receive their orders together (sequentially and uninterrupted). Block S140 can further prioritize the patron's order, such as based on a reward program subscribed to by the patron, by bumping the patron's order forward in the queue. However, Block S140 can function in any other way to specify a start time for the burger.

Block S150 of the first method S100 recites submitting the recipe, the cooking schedule, and the sandwich build start time to a robotic sandwich assembly apparatus. Generally, once the cooking recipe and schedule is accepted by the patron in Block S130 and the start time for the burger is specified in Block S140, Block S150 functions to upload order-related data to the robotic sandwich assembly apparatus to fulfill the customized burger order at or by the specified delivery time. As described above, the recipe and cooking schedule can be transmitted from the patron's mobile computing device directly to the robotic sandwich assembly apparatus or indirectly routed via a remote network. Various Blocks of the first method S100 can alternatively be implemented on the remote server, which can transmit order-related data directly or indirectly to the robotic sandwich assembly apparatus, such as over the Internet or other network. Once the order is submitted to the robotic sandwich assembly apparatus, the robotic sandwich assembly apparatus can implement the order by assembling and cooking the burger according to the recipe and schedule.

Block S150 can further include tracking the patron's burger order as the burger is assembled in the robotic sandwich assembly apparatus. For example, Block S150 can interface with the robotic sandwich assembly apparatus to identify a current stage of the burger, such as meat-grinding, patty-pressing, broiling, bun toasting, topping addition, condiment addition, bagging, and ready-for-pickup. At each stage, Block S150 can notify the patron of his burger's status, such as by pushing a notification to the patron's mobile computing device. For example, Block S150 can push notifications that recite "Patty press complete; beginning broil" and then "Tomatoes added; moving to pickles" to the patron's mobile computing device substantially in real time. In this implementation, Block S150 can further enable the patron to make last-minute changes to his order before each schedule (e.g., patty doneness) or ingredient order is realized. For example, upon receiving the "Tomatoes added; moving to pickles" notification, the patron can access the burger order through the native application executing on the mobile computing device and remove pickles from the order, and Block S150 can receive the change and update the order accordingly.

As shown in FIG. 3, Block S150 can further specify a packaging label for the order. For example, when the burger is completed, the robotic sandwich assembly apparatus can place the burger in a bag or in a box. Block S150 can thus set information to be etched or printed on the bag, on the box, or on a sticker automatically applied to the bag or box. For example, Block S150 can specify any one or more of the patron's name, nickname, or username, a custom burger name set by the patron (e.g., "The Fat Jared," the "Feelin' Chubs Today But Dying For A Burger," or the "Vegans Eat Burgers Too"), a list of ingredients and/or ingredient quantities, a cooking schedule or patty doneness, nutritional content in a 'Daily Value' table, a total number of calories, a number of likes submitted by friends of the patron through a social networking system in response to a post to the social networking system of the patron's order, and/or any other suitable or relevant information. However, Block S150 can function in any other way to submit the recipe, the cooking schedule, and the sandwich build start time to the robotic sandwich assembly apparatus.

The first method S100 can further interface with one or more optical sensors (i.e., one or more digital cameras) arranged within the robotic sandwich assembly apparatus to transmit an image of the patron's burger during assembly. For example, the first method S100 can transmit a live video feed of the patron's burger to the patron's mobile computing device, such as through a native sandwich-ordering application executing on the mobile computing device. In this example, the live video feed can images of the patty cooking in the broiler, the bun toasting in a toaster, application of selected toppings and condiments, and final packaging of the completed burger. The live video feed can also include an augmented reality overlay, such as a dot or other marker indicating the specific patty, bun, etc. that belongs to the patron's burger, such as for images that depict multiple buns or patties. The augmented reality overlay can also show the temperature of the patty (e.g., as measured by a laser-type contactless temperature sensor arranged within the robotic sandwich assembly apparatus) as the patty moves through the broiler, the weight of each topping and/or condiment added to the burger, the time remaining to complete the burger order, completed and/or remaining steps in the burger order, or any other relevant information. The first method S100 can thus enable the patron to view and monitor assembly of his burger substantially in real time. The first method S100 can also enable the user to make last-minute changes to his order, such as before his burger enters a particular module within the robotic sandwich assembly apparatus. For example, the first method S100 can enable the user to adjust the doneness of the patty before the patty enters the broiler, can enable the user to change the topping selection for the burger before the burger and bottom bun enter the topping slicer, and can enable the user to change the condiment selection for the burger before the burger, bottom bun, and toppings enter the condiment dispenser. The first method S100 can thus provide the patron with real-time burger assembly feedback through the live video feed and enable last-minute order changes based on current burger assembly progress.

2. Second Method and Applications

Figure 4:
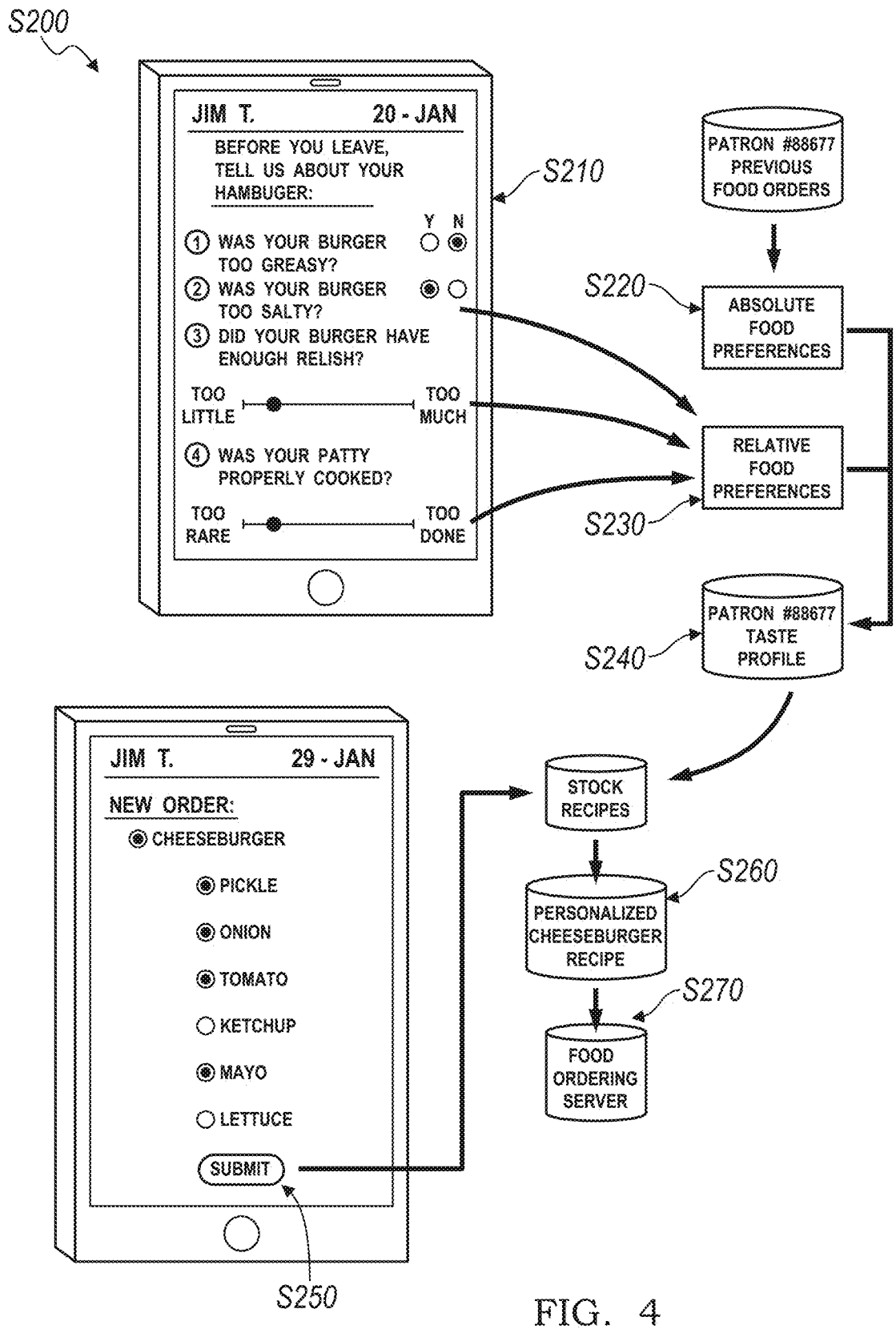
FIG. 4 is a flowchart representation of a second method of one embodiment of the invention.

As shown in FIG. 4, a method S200 for personalizing food orders includes: from a patron, receiving a taste feedback for a first food item in a first food order submitted previously by the patron in Block S210; predicting an absolute food preference of the patron from the first food order in Block S220; predicting a relative taste preference of the patron based on the taste feedback and a recipe of the first food item in Block S230; generating a taste profile of the patron based on the absolute food preference and the relative taste preference in Block S240; from the patron, receiving a selection for a second food item in a new food order in Block S250, the second food item different than the first food item; applying the taste profile of the patron to a recipe for the second food item to generate a personalized recipe in Block S260; and submitting the personalized recipe with the new food order to a robotic food assembly apparatus in Block S270.

As shown in FIG. 4, one variation of the second method S200 includes: identifying an absolute food preference of a patron from a trend within a set of food orders previously submitted by the patron in Block S220; identifying a relative taste preference of the patron from the set of food orders in Block S230; generating a taste profile of the patron based on the absolute food preference and the relative taste preference in Block S240; from the patron, receiving a selection for a new food item in a new food order in Block S250, the new food item unique to the set of food items; applying the taste profile of the patron to a stock recipe for the new food item to generate a personalized recipe in Block S260; and submitting the personalized recipe with the new food order to a food ordering system in Block S270.

Figure 5:
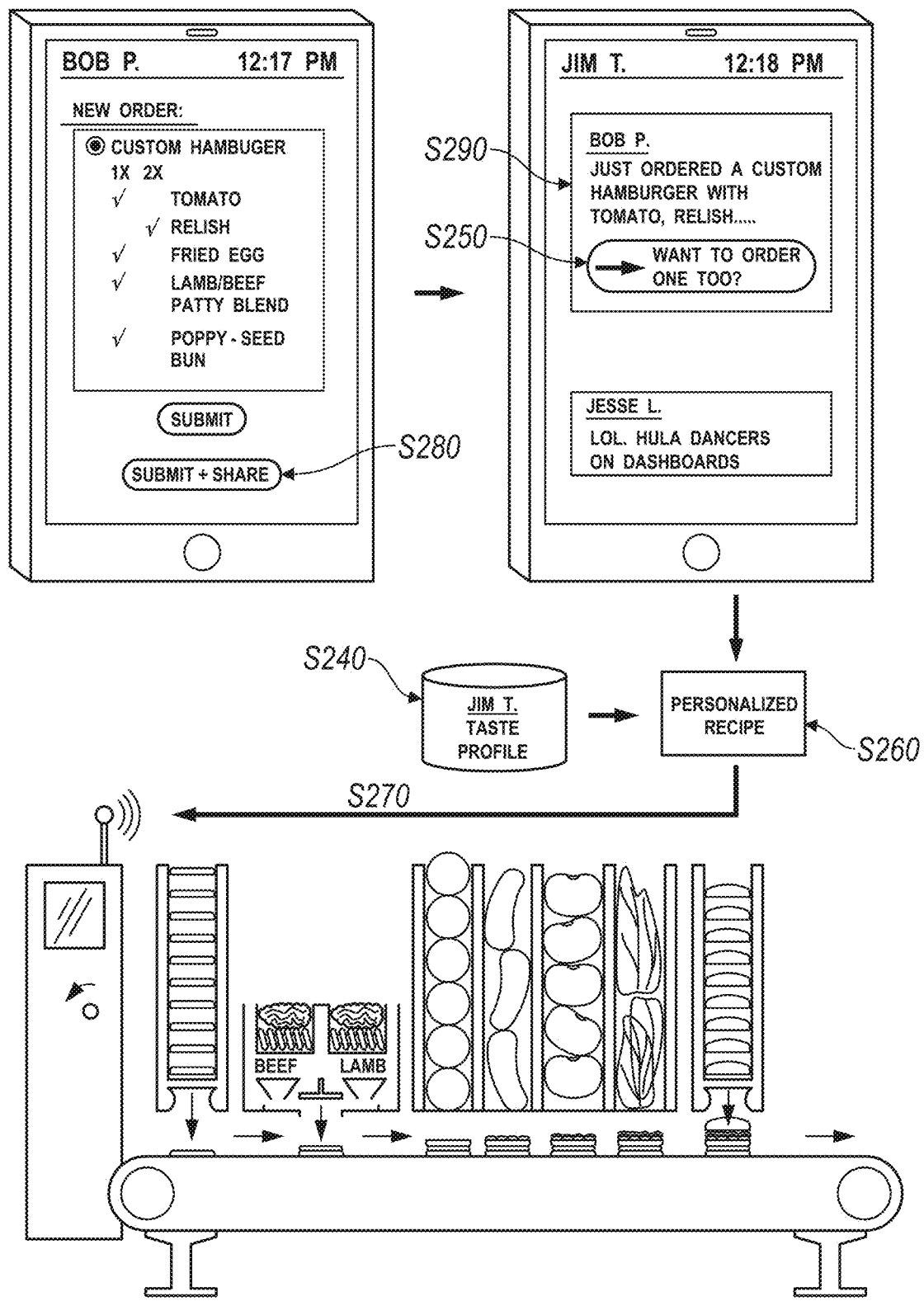
FIG. 5 is a flowchart representation of one variation of the second method.

As shown in FIG. 5, one application of the second method S200 includes: from a first patron, receiving a first order for a custom food item in Block S280; in response to authorization by the first patron, sharing the custom order with a second patron in Block S290; from a second patron, receiving a selection for a duplicate of the custom food item in a second food order in Block S250; retrieving a taste profile for the second patron in Block S240, the taste profile defining an absolute food preference and a relative taste preference associated with the second patron; applying the taste profile to a recipe for the custom food item to generate a personalized recipe for the second food order in Block S260; and submitting the personalized recipe with the second food order to a food ordering system in Block S270.

Generally, the second method S200 functions to aggregate order history of and/or order feedback submitted by a patron to one or more food establishments (e.g., a restaurant, a food ordering system, a robotic sandwich assembly apparatus, etc.) into a taste profile specific to the patron and defining preferences for types and quantities of ingredients applicable to a variety of food items, and the second method S200 then applies the patron's taste profile to a new food item selected by the patron in a new food order to automatically personalize the food item for the patron. In particular, the second method S200 amasses types of food items ordered by the patron, ingredients added and/or removed from the food items by the patron, and/or feedback submitted by the patron in response to fulfillment of the food items into a taste profile that defines absolute taste preferences—such as whether or not to include an ingredient in a future food item ordered by the patron—and relative taste preferences—such as how much of an ingredient to include in the future food item relative to a stock (i.e., preset, predefined) recipe for the future food item. Then, during or following construction of a new food order including a new food item, the second method S200 automatically applies the patron's taste profile to the new food item by editing the recipe for the food item to reflect the absolute and relative taste preferences of the patron as defined in the patron's taste profile.

The second method S200 therefore functions to personalize food items for a patron, such as standard menu items or custom menu items customized by the patron or another patron, to substantially ensure that any food item ordered by the patron will be palatable, satisfactory, if not much enjoyed by the patron. As above, from hereinafter, the second method S200 is described generally in the context of sandwiches and specifically in the context of burgers (e.g., hamburgers, cheeseburgers, and veggie burgers).

In one example, the second method S200 generates and implements a patron's taste profile that is specific to hamburgers. In this example, as the patron frequents a hamburger joint (e.g., a hamburger joint housing a robotic sandwich assembly apparatus as described above) over time, the second method S200 collects data on types of hamburgers selected by the patron, such as plain hamburgers, veggie burgers, cheddar cheese and mushroom burgers, avocado and tomato burgers, etc. and extrapolates a preference for a "type" of burger (e.g., greasy, fresh, loaded with toppings, vegetarian, etc.) preferred by the patron as trends (or patron habits) become apparent in the patron's order history. The second method S200 also collects data on selections for ingredients to add to and to remove from standard hamburgers (e.g., addition of pickles and removal of tomatoes), selections for patty doneness (e.g., rare, well-done), selections for hamburger size (e.g., ⅓lb., ½lb., ¾lb.), and/or selections for total hamburger (or meal) calories, etc. submitted by the patron in previous food orders for hamburgers. The second method S200 additionally or alternatively collects patron feedback on hamburgers provided in fulfilled food orders, such as qualitative feedback reciting "too salty," "perfect amount of mustard," "not quite enough food," "patty too dry," "perfect toast on the bun," and/or "burger was a little too wet." The second method S200 then assembles these data into a taste profile for the patron or updates the patron's existing taste profile that specifies one or more flavor profiles preferred by the patron (e.g., sweet, savory, light, greasy, meaty, vegetarian, etc.), absolutely preferences for which ingredients to include and which to exclude from personalized hamburger recipes for the patron, how much to cook a patty and toast a bun, and how much salt, pepper, mustard, ketchup, tomato, relish, onion, lettuce, and/or pickle, etc. to load onto a burger. Then, when the patron initiates a new food order for a new hamburger that was not previously ordered by the patron, the second method S200 can apply the patron's taste profile to a recipe for the new hamburger to align the preparation method and ingredients in the new hamburger with the patron's taste preferences. Similarly, when the patron initiates a new food order for a same hamburger specified in a previous order by the patron, the second method S200 can personalize a recipe for the hamburger with the patron's taste profile to match the flavor of the hamburger to that which was ordered previously by the patron, or the second method S200 can adjust the recipe for the hamburger according to the patron's taste profile to better match the patron's taste preferences over the hamburger to that which was previously delivered to the patron.

In the application described above, the second method S200 can further function to share details of a custom food item submitted by a first patron with a second patron such that the second patron can order the same custom food item as the first patron. The second method S200 can then apply the taste profile of the second patron to the second patron's order for the custom food item to personalize the custom food item. In particular, in this application, the second method S200 can implement the second patron's taste profile to align a recipe for a custom food item with preparation and ingredient type and quantity preferences of the second patron, thereby substantially ensuring that the custom food item ordered by the first patron and copied into an order by the second patron will be palatable, satisfactory, if not much enjoyed by the second patron.

2.1 Taste Feedback

Block S210 of the second method S200 recites, from a patron, receiving a taste feedback for a first food item in a first food order submitted previously by the patron. Generally, Block S210 functions to collect data pertaining to the patron's palate (i.e., tastes) and to pass these data to Block S220 and Block S230 for extrapolation of absolute and relative taste preferences that are aggregated into the patron's taste profile in Block S240. Block S210 can thus collect taste feedback for one or more food items previously ordered by the patron, and subsequent Blocks of the second method S200 can cooperate to apply a corresponding taste profile of the patron to a food item never before ordered by the patron. Block S210 can additionally or alternatively collect taste feedback for a food item previously ordered by the patron, and subsequent Blocks of the second method S200 can cooperate to apply the patron's taste profile to a new order for the same food item, such as to subtly improve a match between the flavor of the food item to the patron's palate or to collect more specific feedback on nuances of the flavor of the food item and/or the patron's palate.

In one implementation, Block S210 collects taste feedback of the patron in the form of qualitative responses from the patron to the first food item through the native food ordering application following fulfillment of the first food order. In one example, the patron submits a food order through a native food ordering application executing on his mobile computing device (e.g., a smartphone), and the Block S210—implemented within the native food ordering application—tracks the user's location while inside a restaurant or within a predefined distance of a robotic food assembly apparatus (shown in FIG. 5) that fulfills the food order. In this example, once the patron moves outside of a geofenced area around the restaurant or moved beyond the predefined distance from the robotic food assembly apparatus—as detected through a location (e.g., GPS) sensor within he patron's mobile computing device—Block S210 delivers a notification to the patron through the native food ordering application to review his meal. In another example, the patron can submit his food order through a digital kiosk arranged within a restaurant and/or coupled to the robotic food assembly apparatus, the kiosk can collect the patron's email address, and Block S210 can email a survey for the food order to the patron's email address. However, Block S210 can prompt the patron to provide feedback for one or more food orders in any other way and through any other suitable conduit.

In this foregoing implementation, Block S210 can prompt the patron to enter absolute or scaled feedback for one or more parameters corresponding to the previous food order. For example, Block S210 can prompt the patron to select either of a "YES" or "NO" radio button for one or more of the following prompts: "are you full," "are you still hungry," "was your burger too greasy," "was your patty undercooked," "what your burger too salty," "did your burger have enough veggies," "did we add enough mustard," "did you like the pickles on your burger," and/or "would your burger have tasted better with poppy seeds on your bun," etc., as shown in FIG. 4. Block S210 can additionally or alternatively prompt the patron to move a slider bar between "not enough" and "too much" positions or between "not satisfied" and "fully satisfied" positions for one or more of the following prompts: "did you get enough to eat," "did your burger have enough relish," "was your bun sufficiently toasted," "did we properly cook your patty to medium-rare," and/or "was you burger at the right temperature when you began to consume it," etc., as shown in FIG. 4. Block S210 can present any of these prompts to the patron through the food ordering application, through an email application, or through a web browser, etc. executing on the patron's mobile computing device or other computing device accessed by the patron. However, Block S210 can collect any other feedback related to the patron's previous food order and in any other way.

Block S210 can additionally or alternatively retrieve one or more food orders previously submitted by the patron and extract types of food items, ingredient additions and subtractions, and/or food preparation elections selected by the patron. For example, Block S210 can retrieve a set of food orders from a database of previous food orders submitted to a particular robotic food assembly apparatus, a set of robotic food assembly apparatuses, a food truck, a set of food trucks, a restaurant, and/or a restaurant chain, etc., wherein food orders in the set are grouped by a phone number, a system of payment (e.g., a credit card), an ordering account username or profile, email address, or other identifier provided by the patron with submission of each order. Block S210 can then extract relevant food types, ingredient additions and subtraction, and/or preparation selections from the food orders in specific to the patron. However, Block S210 can collect food order and/or food item feedback related to the patron in any other suitable way.

2.2 Absolute Food Preference

Block S220 of the second method S200 recites predicting an absolute food preference of the patron from the first food order. Block S220 can similarly recite identifying an absolute food preference of a patron from a trend within a set of food orders previously submitted by the patron. Generally, Block S220 functions to extract one or more absolute food-related preferences from one or more food orders previously submitted by the patron. In particular, Block S220 identifies trends in food orders submitted by the patron, such as orders for various food types (e.g., hamburgers, hot dogs, omelets, salads, and/or burritos, etc.), orders for a particular food type (e.g., hamburgers), or orders for a particular category or genre of a particular food type (e.g., Asian-style hamburgers, gourmet hamburgers, cheeseburgers, bacon and mushroom cheeseburgers, or veggie burgers, etc.).

In one example, Block S220 analyzes a set of previous food orders submitted by the patron and identifies habitual preparation, ingredient addition, and/or ingredient deletions elections made by the patron across the set of previous food orders. In this example, if the patron submits ten orders for a hamburger over the course of eight weeks, and nine out of the ten orders elected medium-rare and no pickles, Block S220 can predict that the patron prefers his hamburger patties cooked medium-rare and his hamburger delivered without pickles. Furthermore, in this example, if two of the ten orders elected no tomatoes, five of the ten orders specified extra tomatoes, and the remainder of the ten orders elected no change to the amount of tomatoes specified in the stock recipes for the corresponding burgers, Block S220 can tag changes to stock tomato specifications as non-habitual.

In one implementation, Block S220 correlates election of a particular ingredient for addition to one or more food items—of a particular food type—in previous food orders with a preference for the particular ingredient in food items of the particular food type. For example, Block S210 can collect food orders specific to hamburgers previously ordered by the patron, and Block S220 can correlate consistent (e.g., repeated) election of a particular topping (e.g., pickles, lettuce, tomato, fried egg, or jalapeños, etc.) for addition onto an ordered hamburger with the patron's preference for addition of the particular topping onto any hamburger ordered by the patron. In this implementation, Block S220 can also apply different thresholds to consistency or repetition of topping addition election based on a commonality of the ingredient. For example, Block S220 can set a low threshold for patron preference for common ingredients like tomato, onion, lettuce, etc. such that a preference for such a common ingredient is associated with the patron if the patron elects to add such a common ingredient at a relatively low frequency (e.g., within at least 65% of orders). In this example, Block S220 can also set a high threshold for patron preference for uncommon ingredients like fried egg, apple, and guacamole, etc. such that a preference for such an uncommon ingredient is associated with the patron only if the patron elects to add such an uncommon ingredient at a relatively high frequency (e.g., within at least 90% of orders).

Block S220 can similarly identify a trend in elected omission of a particular ingredient in one or more food orders previously submitted by the patron. In particular, Block S220 can correlate deletion of a particular ingredient from one or more previous orders for a particular type of food item with a distance for the particular ingredient in food items of the particular food type. For example, Block S210 can collect food orders specific to hamburgers previously ordered by the patron, and Block S220 can correlate consistent deletion of a particular topping from hamburger orders with the patron's preference that the particular topping not be served with his hamburgers.

Block S220 can also identify a trend in food item preparation election by the patron and correlate this trend with a preference for how a particular type of food item is prepared. For example, Block S220 can identify a trend in election of a particular meat doneness for hamburgers ordered by the patron across multiple food orders. For example, if the patron routinely orders his hamburger patty well-done, Block S220 can identify a patron preference for well-done hamburger patties. Block can yet similarly identify a trend in food item size election by the patron and correlate this trend with a preference food item size. For example, if the patron consistently orders hamburgers with ⅓lb. patties, Block S220 can correlate this patron elections with a preference for hamburgers with ⅓lb. patties.

However, Block S220 can identify a patron preference for any other absolute parameter for any food order, for a food item of a particular type, or for a food item within a particular category or genre of a particular food item type, such as (maximum) price, (maximum number of) calories, bun type or style, ingredient (e.g., sauce, topping, cheese), combinations of ingredients, meat type or blend of meats in a patty, delivery method (e.g., plated, wrapped, or boxed), etc.

2.3 Relative Taste Preference

Block S230 of the second method S200 recites predicting a relative taste preference of the patron based on the taste feedback and a recipe of the first food item. Block S230 can similarly recite identifying a relative taste preference of the patron from the set of food orders. Generally, Block S230 functions to extract one or more relative food-related preferences from one or more food orders and/or food order feedback previously submitted by the patron. In particular, Block S230 identifies patron preferences for relative degrees of parameters of a food item, such as how much of an ingredient to include or to what extent to prepare (e.g., cook) an ingredient relative to standard (i.e., stock) recipe for a food item.

In one implementation in which Block S210 collects qualitative feedback from the patron in the form of radio button selections and/or sliders bar adjustments, Block S230 can correlate a qualitative response submitted by the patron with a preference for a relative quantitative difference between a delivered amount of a particular ingredient in a food item and a standard amount of the particular ingredient specified in a stock recipe for the food item. In one example in which Block S210 prompts the patron to respond to the question "was your burger too greasy" by selecting a "YES" or a "NO" radio button, Block S230 can correlate a "NO" response with either no preference for greasiness of a hamburger or with indicator that the (actual or predicted) greasiness of the hamburger was satisfactory. However, in this example, Block S230 can correlate a "YES" response to this question with a patron preference for a quantitative reduction in greasiness in delivered hamburgers, such as 25% less grease than standard for all hamburgers ordered by the patron. In this example, Block S220 can additionally or alternatively implement this patron feedback to set a maximum greasiness of 8% by mass for all hamburgers ordered by the patron. In a similar example in which Block S210 prompts the patron to respond to the question "did your burger have enough veggies" by selecting a "YES" or a "NO" radio button, Block S230 can correlate a "NO" response with a preference for more veggies on all hamburgers ordered by the patron (or all burgers of the same type or category), such as a preset step increment of 20% more veggies by weight—relative to a standard or stock recipe—for all hamburgers ordered by the patron (or all burgers of the same type or category). However, Block S230 (and Block S220) can similarly correlate binary (i.e., "YES" or "NO") feedback for any other related question with a preference for a relative change in an amount of an ingredient or preparation procedure for a food item, such as relative to a stock recipe for a food item.

In another example of the foregoing implementation in which Block S210 receives a slider bar adjustment between a "not enough" position and a "too much" positions for a prompt reciting "did your burger have enough relish," Block S230 can assign the extreme "not enough" position with a patron preference for 25% more relish, the extreme "too much" with a patron preference for 25% less relish, and the center position on the slider bar with a preference for no change in application of relish on the corresponding food item, and Block S230 can extrapolate preferences for percentage changes in delivered relish along a spectrum between 25% less and 25% more based on final placement of the slider along the slider bar. In this example, Block S230 can thus identify a patron preference for application of a single ingredient into a food item. In a similar example in which Block S210 receives a slider bar adjustment between a "not enough" position and a "too much" positions for a prompt reciting "was your burger salted to taste," Block S230 can assign the extreme "not enough" position with a patron preference for 15% more total salt, the extreme "too much" with a patron preference for 15% less total salt, and the center position on the slider bar with a preference for no change in total salt content of the corresponding food item, and Block S230 can extrapolate preferences for percentage changes in total burger salt content along a spectrum between 15% less and 15% more based on final placement of the slider along the slider bar. Thus, in this example, Block S230 can identify a patron preference for an aggregate amount of an ingredient in a food item relative to a stock or standard amount of the ingredient specified in a recipe, or Block S230 can identify a patron preference for an relative amount of the ingredient in multiple components of a food item, such as an amount of salt in a bun, an amount of salt in a burger patty, and/or an amount of salt in a sauce or relish, etc. Block S230 can thus extrapolate—from qualitative feedback provided by the patron—a preference for a percentage difference between a delivered amount of an ingredient (e.g., salt, pickle, tomato, ground beef, etc.) in a food item and a standard amount of an ingredient specified in a recipe for the food item.

Block S230 can also identify preferred combinations (i.e., ratios) of ingredients in a food item from qualitative feedback collected from the patron in Block S210. In one example in which Block S210 receives a slider bar adjustment between a "not enough" position and a "too much" positions for a prompt reciting "did your burger have the right amount of 'gameyness,'" Block S230 can assign a spectrum of ratios of ground lamb to ground beef in hamburger patties to slider positions along the slider bar, such as a lamb-to-beef ratio of 1:0 for the extreme "not enough" position, a lamb-to-beef ratio of 0:1 for the extreme "too much" position, a lamb-to-beef ratio of 1:1 for the center between the two extreme positions, and a linear change between the 1:0 and 0:1 positions therebetween. Block S230 can thus extrapolate a preference for a patty meat blend from qualitative feedback provided by the patron.

Block S210 can additionally or alternatively collect quantitative feedback from the patron, such as by receiving a response to a prompt "should we change the amount of salt in your burger next time" in the form of a slider position selection between "20% less" and "20% more" positions, and Block S230 can identify a patron taste preference accordingly.

In the foregoing implementations and examples, Block S230 can also normalize definitions assigned to the extremes of the slider bar. For example, one patron may historically treat a slider bar as a ternary input selection for "too rare," "perfect," and "too done" in response to a prompt reciting "was your patty cooked to your liking," and Block S230 can convert a bar position nearest the "too rare" to a patron preference for a center patty temperature that is 5° F. higher than the center temperature of the corresponding delivered patty and a bar position that is nearest the "too done" position to a patron preference for a center patty temperature that is 2° F. lower than the center temperature of the corresponding delivered patty. In this example, a second patron may historically pay careful attention to the position of the slider bar, and Block S230 can thus handle a slider bar input for patty doneness as a continuum of preferred changes in center patty temperature, such as to a resolution of 0.1° F. In this example, Block S230 can thus analyze the patron's feedback history to identify how the patron responds to prompts and then normalize new feedback accordingly.

Block S230 can also normalize a particular feedback to a corresponding food item order. For example, the patron can customize a standard hamburger by ordering the hamburger with extra (e.g., 100% extra) pickles, and Block S210 can receive feedback from the patron indicating that the hamburger has too many pickles. Block S230 can thus extrapolate a patron preference for more than a standard amount of pickles specified in a hamburger recipe but less than 100% extra pickles in a delivered hamburger. In this example, Block S230 can thus cooperate with Block S240 to set a target difference of a 50% increase in delivered pickles over a standard amount of pickles specified in a hamburger recipe for hamburgers ordered by the patron.

Like Block S220, Block S230 can extrapolate a relative taste preference of the patron from a series of orders submitted by the patron over time. In particular, Block S230 can identify trends in order feedback provided by the patron, in food item types (or categories, genres, etc.) ordered by the patron, and/or in ingredients added and/or removed from food items ordered by the patron, and Block S230 can extrapolate one or more taste preferences from these trends. For example, if the patron repeatedly supplied feedback indicating that his hamburger was too greasy, Block S230 can identify a patron preference for less grease in his hamburger with a sufficiently high degree of confidence. In another example, if the patron occasionally provides feedback indicating that his burger was too salty and other times provides feedback that his burger was under-salted, Block S230 can ignore this feedback as lacking consistency (e.g., impulsive). However, in this example, Block S230 can combine these over- and under-salted feedback responses with a known or predicted amount of salt (and other parameters) delivered in the corresponding hamburgers—such as feedback indicating too much salt in a large bacon and cheddar cheese burger and feedback indicating too little salt in a small plain hamburger with lettuce—to extrapolate a preference for a particular amount of salt in a hamburger, a preference for a particular percentage of salt by weight in a hamburger, or a suitable range of total salt or percentage salt by weight in a hamburger, etc.

Like Block S220, Block S230 can identify relative taste preferences that correspond to multiple food types (e.g., hamburgers, hot dogs, omelets, salads, and/or burritos, etc.), that correspond to a particular food type (e.g., hamburgers), and/or that correspond to a particular category or genre of a particular food type (e.g., Asian-style hamburgers, gourmet hamburgers, cheeseburgers, bacon and mushroom cheeseburgers, or veggie burgers, etc.). For example, as a preceding example in which the patron submits ten orders for a hamburger over the course of eight weeks, and nine out of the ten orders elected medium-rare and no pickles, if two orders specified no tomatoes were for bacon, mushroom, and cheese burgers, if the five orders specifying extra tomatoes were for veggie hamburgers, and the two orders specifying the standard amount of tomato were for plain hamburgers, Block S230 can determine that the patron does not like tomatoes on his bacon, mushroom, and cheese burgers, that he prefers extra tomatoes on his veggie burgers, and that he trusts a preset amount of tomatoes for his standard hamburgers (i.e., as defined in a recipe for standard hamburgers).

Block S230 can also combine taste feedback of the patron with taste feedback of another patron to predict a taste preference of the patron, such as if limited taste feedback is available from the patron. For example, if only one or two feedback examples are available from the patron though the patron has submitted several (e.g., more than ten) orders for hamburgers, Block S230 can identify a second patron who has ordered similar hamburgers and/or provided feedback similar to that provided by the patron. Block S230 can then apply taste preferences of the second patron to the patron to augment or supplement predicted taste preferences of the patron. Block S230 can additionally or alternatively access a demographic of the patron, identify a second patron of a demographic similar to the demographic of the patron, and apply (e.g., merge) a relative food preference of the second patron with taste feedback submitted by the patron to predict a relative taste preference of the patron.

2.4 Taste Preference Conditions

Blocks S220 and S230 can also identify trends in patron elections or feedback for absolute or relative food item parameters based on meal type, time of day, day of week, patron mood, total meal size, etc. and identify or predict the patron's taste preferences for these one or more conditions accordingly. For example, Block S220 can identify a patron preference for veggie patties and Block S230 can identity a patron preference for 50% more lettuce and tomatoes for hamburgers ordered around lunch time on weekdays, and Blocks S220 and S230 can cooperate to identify patron preferences for rare 50% beef and 50% bison patties, mushrooms, and double cheddar cheese for hamburgers ordered around Friday and Saturday evenings. Block S240 can thus generate multiple taste profiles for the patron, each associated with one or more conditions defining its application, such as meal type, time of day, day of week, patron mood, and/or total meal size, etc. for an order initiated by the patron.

However, Blocks S230 and S240 can function in any other way to extract absolute and relative taste preferences of the patron, respectively, from previous food orders and/or food order feedback previously submitted by the patron.

2.5 Taste Profile

Block S240 of the second method S200 recites generating a taste profile of the patron based on the absolute food preference and the relative taste preference. Generally, Block S240 functions to aggregate one or more absolute and relative taste preferences of the patron into a taste profile that can be applied to subsequent food orders submitted by the patron to automatically personalize these subsequent food orders for the patron. For example, Block S240 can generate a taste profile that is applied to an any food order submitted to a robotic food assembly apparatus or to a restaurant within a restaurant chain, to any food item of a particular type (e.g., a hamburger), to any food item within a particular category or genre food type (e.g., veggie burgers, Asian-style hamburgers). Block S240 can also aggregate absolute and/or relative taste preferences of the patron into multiple taste profiles, each corresponding to a different single or set of conditions, such as a food item type, a food item genre or category, the patron's mood, a meal type, a time of day, a day of the week, and/or a meal size, etc.

In one example implementation, Block S240 generates the taste profile that specifies absolute and relative values for constructing a hamburger to satisfy the patron's palate, Block S240 can generate a taste profile that specifies an absolute or relative amount of one or more ingredients (e.g., toppings, condiments) to be included in a hamburger ordered by the patron, a type and/or amount of meats and extra ingredients to form into a patty for a hamburger ordered by the patron, a target doneness level for a patty in a hamburger ordered by the patron, a bread type and toast level of a bun in a hamburger ordered by the patron, a saltiness and greasiness level of a hamburger ordered by the patron, a maximum number of calories (or calories from fat, carbohydrates, etc.) in a hamburger ordered by the patron, and/or a maximum price of a hamburger ordered by the patron, etc. In this example implementation, once a new order or selection for a hamburger is received from the patron in Block S250, Block S260 can apply the patron's taste profile to the selected hamburger, such as by compromising these parameters for the particular hamburger selected as described above in the first method S100.

Once the taste profile is generated for the patron, Block 5240 can store the patron's taste profile locally with the patron, such as on a mobile computing device (e.g., a smartphone) executing a native food ordering application used by the patron to order food items. Alternatively, Block S240 can store the patron's taste profile remotely such as in a database of taste profiles connected to a computer network. Block S240 can thus associate the taste profile with an identifier of the corresponding patron, such as a system of payment (e.g., a credit card), a phone number, an email address, a name, or a username and password, etc. such that the taste profile can be recalled and properly applied to future orders by the patron.

However, Block S240 can function in any other way to aggregate taste preferences identified in Block S220 and S230 into a taste profile defining application of the patron's taste preferences to food items subsequently ordered by the patron.

2.5 New Food Order

Block S250 of the second method S200 recites receiving, from the patron, a selection for a food item in a new food order. Generally, Block S250 can implement methods and techniques similar to Block S110 of the first method S100 to receive a selection for a food item in a new food order. For example, the patron can initiate a new food order through a native food ordering application executing on his smartphone, wherein the native food ordering application displays a menu of food items supported by a robotic food assembly apparatus within a nearby restaurant or within a restaurant currently occupied by the patron, and Block S250 can receive a selection for a new food item from the menu of supported food items through the native food ordering application. Alternatively, the patron can initiate a new food order through an electronic kiosk arranged within a restaurant or connected to a robotic food assembly apparatus within a restaurant occupied by the patron, and Block S250 can receive a selection for a new food item through the electronic kiosk. However, Block S250 can collect a selection for one or more food items in a new food order from the patron in any other suitable way.

2.6 Personalized Recipe

Block S260 of the second method S200 recites applying the taste profile of the patron to a recipe for food item in the new food order to generate a personalized recipe. Generally, Block S260 functions to apply an absolute taste preference and/or a relative taste preference of the patron to a standard or custom food item ordered by the patron, thereby improving alignment of a flavor profile of the (new) food item to the patron's palate and thus automatically 'personalizing' the standard or custom food item for the patron. In particular, Block S260 accesses a (standard or custom) recipe for the selected food item and modifies types and/or amounts of ingredients and cooking parameters for the food item specified in the recipe. In one example, Block S250 receives a selection for a BBQ bacon cheddar hamburger, a menu item that the patron has not ordered before (or has not ordered within a threshold period of time, such as within the past six months), and Block S260 applies the taste profile—which was generated by analyzing food orders and patron feedback for other food items—to the BBQ bacon cheddar hamburger to substantially ensure that a flavor profile of the BBQ bacon cheddar hamburger aligns with patron's taste preferences. In another example, Block S250 receives a selection for a custom hamburger with a fried egg and sprouts, a custom hamburger that the patron has ordered previously and that was previously analyzed in Blocks 5220 and 5230, and Block 5260 applies the patron's taste profile to the custom hamburger to better match that flavor profile of the custom hamburger to the patron's palate in comparison to an order for the same custom hamburger that was previously delivered to the patron.

Block S260 can apply the taste profile of the patron to a food item added to a new food order as the patron assembles the food order (e.g., at a kiosk within a restaurant location), once the patron submits the food order and before the food order is uploaded to a food ordering system (e.g., within a native food ordering application executing on the patron's smartphone), and/or once the food order is submitted to the food ordering system (e.g., on a remote server or computer network connected to a robotic food assembly apparatus). For example, Block S260 can access the patron's taste profile from local memory within the patron's mobile computing device as the patron interfaces with a native food ordering application executing thereon to build an order. Block S260 can similarly retrieve the taste profile from a remote server, such as based on a user profile logged-in to the native food ordering application executing on the patron's mobile computing device. Alternatively, Block S260 can access or retrieve the taste profile and apply the taste profile to a new food order accordingly by matching identifying information extracted from a system of payment supplied by the patron to a particular taste profile stored in a taste profile database. However, Block S260 can access and select the taste profile for the patron in any other suitable way.

In one implementation, Block S260 applies an absolute taste preference of the patron to the food item in the new food order. In one example, for the taste profile that specified dislike for a particular ingredient, Block S260 accesses a standard recipe for the selected food item and generates a personalized recipe that omits the particular ingredient from the standard recipe for the food item selected by the patron. In a similar example, the taste profile specifies a dislike for a particular ingredient if a second ingredient is included in a food item, and Block S260 accesses a standard recipe for the selected food item, identifies the second ingredient in the standard recipe for the selected food item, and generates a personalized recipe that omits the particular ingredient from the standard recipe on behalf of the patron. Block S260 can similarly generate a personalized recipe that adds a particular ingredient to a standard recipe for a selected food item based on the taste profile for the patron, such as by specifying addition of (a present or standard amount of) tomato or relish in a recipe for a hamburger ordered by the patron. In another example, Block S260 can generate the personalized recipe that specifies a particular meat doneness, a patty size, and/or a patty grind mix (e.g., 20% lamb, 80% beef) for a hamburger selected by the patron. However, Block S260 can apply any other absolute taste preference to a standard, stock, or custom recipe for a food item selected by the patron to generate a personalized recipe for the food item that compensates for the patron's palate.

In another implementation, Block S260 applies a relative taste preference of the patron to the food item in the new food order. In one example, Block S260 generates the personalized recipe that specifies an amount of a particular ingredient to include in the food item based on a relative taste preference defined in the taste profile and a standard amount of the particular ingredient specified in the stock recipe. In this example, Block S260 can specify 23% more BBQ sauce than set in the standard recipe and/or 33% less pickle(s) than set in the standard recipe for a hamburger.

Block S260 can also selectively apply absolute and relative taste preferences defined in the patron's taste profile. For example, Block S240 can generate the taste profile that assigns conditions to various absolute and relative taste preferences, such as time of day, meal type, day of week, location, etc. In this example, Block S260 can test whether current conditions for selecting taste preferences in the taste profile are currently applicable to the order when the patron initiates an order (or at a time that the patron specifies for pickup of the order), and Block S260 can apply these taste preferences to the food order accordingly.

Block S260 can also apply a patron's absolute and/or relative taste preferences across categories or genres of food. For example, previous Blocks of the method can extrapolate taste preferences from the patron's previous orders for salads, burritos, pizza, ice cream cookie sandwiches, hot dogs, deli sandwiches, falafel, gyros, layered cakes, crepes, waffles, pancakes, and/or omelets and generate a taste profile of the user accordingly, and Block S260 can apply this (generic) taste profile of the patron to a new order submitted by the patron for tacos, thereby tailoring the tacos to the user's taste preferences even if the patron has not previously ordered tacos. In this example, Block S260 can also select past food orders by the patron that are particularly relevant to the new food order (e.g., crepes, burritos, and deli sandwiches with similar ingredients) and trigger Block S240 to generate a taste profile from these select orders.

However, Block S260 can function in any other way to adjust or modify a stock, standard, or existing customized recipe for a food item according to any one or more absolute and/or relative taste preferences defined in the patron's taste profile to personalize the recipe for the food item for the patron prior to preparation of the food item.

Block S270 of the second method S200 recites submitting the personalized recipe with the new food order to a robotic food assembly apparatus. Block S270 can similarly recite submitting the personalized recipe with the new food order to a food ordering system. Generally, Block S270 functions like Block S150 of the first method S100 to deliver the food order with the personalized recipe generated in Block S260 to a system or apparatus that handles preparation and delivery of the food item. For example, Block S270 can upload the personalized recipe with the food order to a computer network connected to the robotic food assembly apparatus—described above—which automatically implements the personalized recipe to build the corresponding personalized food item (e.g., a hamburger) for the patron. However, Block S270 can function in any other way to transmit, upload, or otherwise deliver the food order with the personalized recipe to a robotic food assembly apparatus, to a food ordering system, etc. on behalf of the patron.

2.7 Sharing

In one application, the second method S200 further includes Block S280, which recites, from a first patron, receiving a first order for a custom food item, and Block S290, which recites, in response to authorization by the first patron, sharing the custom order with a second patron. Generally, in this application, Blocks S280 and S290 cooperate to collect a custom food order from one patron (i.e., the first patron) and to then share the custom food order with another patron (i.e., the second patron). Once the custom food item is selected for the new food order by the second patron in Block S250, Blocks S240 and S260 cooperate to automatically apply the second patron's taste preferences to the custom food item to align the types, quantities, and preparation of ingredients in the custom food item to the taste preferences of the second patron. For example, if the custom food item was ordered by the first patron with minimal salt and extra mustard, once the second patron selects the custom food item in Block S250, Block S240 can retrieve the second patron's taste profile that defines a preference for extra (e.g., 32% more) salt and limited (e.g., no more than 5% total mass of the food item) mustard, and Block S260 can modify the custom recipe accordingly before delivery of the personalized recipe to a local restaurant and/or robotic food assembly apparatus on behalf of the second patron.

Alternatively, in this application, Blocks S240 and S260 can apply the second patron's taste profile to the advertisement such that the recipe for the custom food item is personalized for the second patron before the second patron even selects the custom food item for a new food order. For example, if the custom food order previously submitted by the first patron specifies a hamburger with pickles, ketchup, jalapeños, and bleu cheese but the second patron's taste profile precludes pickles, Block S260 can edit the custom recipe that is advertised to the second patron such that the second patron only sees—and can select for his food order—a hamburger with ketchup, jalapeños, and bleu cheese.

In this application, Block S280 recites, from a first patron, receiving a first order for a custom food item. Generally, Block S280 functions like Blocks S110 and S120 of the first method S100 to collect a custom food order from the first patron, such as a food order defining a selection for a particular type of hamburger with a particular set of toppings. Once the first patron submits the order for the custom food item, Block S280 can store the custom order (e.g., on a remote server or computer network) such that the custom order can be later copied into a new order once selected by the second patron.

Block S280 can also retrieve a (first) taste profile corresponding to the first patron and then normalize the order for the custom food item according to (absolute and/or relative) taste preferences of the first patron as defined in the first patron's taste profile. For example, if the first taste profile indicates that the first patron prefers 50% less mustard than normal (i.e., relative to standard recipes), twice at much tomato as is normal, and 40% lamb and 60% beef patties rather than 100% beef patties in his hamburgers, Block S280 can normalize the custom order for the food item—as ordered by the first patron—by increasing the amount of mustard specified in the recipe for the custom food item by 100% (to offset the 50% reduction typical of the first patron), reducing the amount of tomato specified in the recipe for the custom food item by 50% (to offset the 100% increase in tomato typical of the first patron), and resetting the patty composition of the recipe for the custom food item to 100% beef. Block S280 can thus store a 'normalized' version of the custom food item, which can then be personalized for the second patron with the second patron's taste profile once elected in a subsequent food order by the second patron.

Furthermore, in this application, Block S290 recites, in response to authorization by the first patron, sharing the custom order with a second patron. Generally, Block S290 functions to present the custom food order for the custom food item to the second patron and to cooperate with Block S250 to enable the second patron to 'copy' the custom food item into his own (new) food order. Thus, Block S290 and Block S250 can cooperate to enable the second patron to order the same custom (or even standard) food item ordered locally (e.g., at the same restaurant) or remotely (e.g., in a different city or country) by the first patron who may be a friend, a family member, a celebrity, etc.

In one implementation, once the first patron submits the order for the custom food item, Block S290 prompts the first patron to share the custom order. For example, after the first patron submits his custom food order, Block S290 can prompt the first patron to share his custom order on an online social networking system and then automatically post the custom order—with a corresponding custom recipe for the food item and/or a pointer (i.e., electronic link) to the custom recipe for the food item—in a public venue within the online social networking system on behalf of the first patron once the first patron confirms the sharing action. A post for the custom food item can then be accessed by users who follow, who are connected to, who are friends with, or who are otherwise granted access to food orders made by the first patron. In this example, the second patron can review the post on the online social networking system through a native social networking application or web browser executing on a computing device (e.g., a smartphone or tablet) and then select a link or other pointer within the post to initiate a new food order with the custom food item, such as within the online social networking system or within a food ordering application also executing on the computing device and which is automatically opened upon selection of the post or pointer within the native social networking application or web browser. Alternatively, Block S290 can transmit an email notification or other electronic communication—for the custom order shared by the first patron—directly to the second patron, such as by transmitting a notification to the second patron's mobile computing device, transmitting an email to the second patron's email account, presenting the custom order within the second patron's food ordering account accessed through a native food ordering application executing on the patron's mobile computing device, or by posting a notification directly onto the patron's profile within the social networking system.

Block S290 can also selectively share the custom order with the second patron. For example, Block S290 can access a (first) taste profile of the first patron, compare this taste profile with the taste profile of the second patron, and then share the custom food item with the second patron only if the taste profiles of the first and second patrons exhibit at least a threshold similarity. In a similar example, Block S290 can access an order history of the first patron, compare this order history with order history of the second patron, and then share the custom food item with the second patron only if the order histories of the first and second patrons exhibit at least a threshold similarity, such as at least a threshold number of orders for identical food items (e.g., the same cheeseburger) within a threshold period of time (e.g., six months). However, Block S290 can share the first patron's custom order with the second patron in any other suitable way and/or in response to any other condition or similarity between the first and second patrons.

In this application, Block S250 can thus receive a selection by the second patron for the custom food item from within an email, within a native food ordering application executing on the second patron's (mobile) computing device, within a web browser, and/or within an online social networking system, etc. Blocks S240, S260, and S270 of the second method S200 can then execute as described above to access a taste profile of the second patron, to apply the taste profile of the second patron to the custom food item to personalize the custom food item for the second patron, and to then submit a food order for the personalized food item to a food ordering system and/or to a robotic food assembly apparatus for delivery to the second patron.

In one example, if the second patron initiates a new food order from a native food ordering application executing on his smartphone (or other mobile computing device), Block S240 can retrieve the taste profile that is stored locally in memory on the second patron's smartphone. Block S260 can then execute locally on the second patron's smartphone to personalize the recipe for custom food item for the second patron. Alternatively, the native food ordering application executing on the second patron's smartphone can pass an identifier of the second patron to a food ordering system that can then retrieve the taste profile from a database of taste profiles based on the identifier of the second patron. In this example, once Block S250 receives the selection for the custom food item from the second patron, Block S260 can execute on the food ordering system (or other computer network) to apply the second patron's taste profile to the recipe for the custom food item selected by the second patron. However, Block S240 can select, identify, and/or retrieve the taste profile of the second patron from any other local or remote memory or database, and Block S260 can execute locally (e.g., on the second patron's smartphone) or remotely (e.g., on a computer network or food ordering system) to modify the recipe for the custom food item specifically for the second patron.

However, Blocks S280, S290, S250, S240, S260, and S270 can cooperate in any other way to share a custom food item ordered by a first patron with a second patron and to automatically personalize the custom food item for the second patron based on the second patron's taste profile.

The second method S200s and robotic sandwich assembly apparatus of the embodiments can be embodied and/or implemented at least in part as a machine configured to receive a computer-readable medium storing computer-readable instructions. The instructions can be executed by computer-executable components integrated with an application, applet, host, server, network, website, communication service, communication interface, hardware/firmware/software elements of a user computer or mobile device, or any suitable combination thereof. Other systems and methods of the embodiments can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

Interfaces

In FIG. 6, customers 304-1, 304-2, and 304-3 are placing orders with an establishment 300 that includes a food creation robot 308-1. For example, the food creation robot 308-1 may be configured to create sandwiches such as hamburgers. Subsystems 312 of the food creation robot 308-1 may therefore include, for example, a subsystem that slices, butters, and toasts hamburger buns, a subsystem that slices and dispenses vegetables, a subsystem that dispenses liquid sauces, a subsystem that dispenses powdered seasonings, a subsystem that grinds and cooks meat, etc. Subsystems 312 are coordinated by a robot control module 316.

A networking router 320 permits the robot control module 316 to communicate with an ordering system 324. In various establishments, multiple food creation robots may be present. As an example only, a second food creation robot 308-2 is shown in FIG. 6. A wireless access point 328 may provide wireless Internet access to customers of the establishment 300. A router 332 connects the wireless access point 328 to a distributed communications system 336, which may include the Internet.

The ordering system 324 may receive orders from the distributed communications system 336 via a bridge 340, which may bridge between the ordering system 324 on an internal network and the router 332 on an external network. Orders may also arrive in the order system 324 via the wireless access point 328. In various implementations, a second internal wireless network may be used to allow employee devices to communicate with the ordering system 324 without traversing the bridge 340. For example, a concierge 350 may assist customers, such as the customer 304-1, with placing orders using an ordering terminal 354.

The ordering terminal 354 may wirelessly communicate with the wireless access point 328 or, because the ordering terminal 354 is owned by the establishment 300, with a wireless access point (not shown) that communicates with the ordering system 324 without traversing the bridge 340. As an example only, the ordering terminal 354 may be a kiosk implemented with a Windows operating system computer, a MacOS operating system computer, or an iOS operating system tablet. The customer 304-2 may place an order using a mobile device 358-1, such as an iOS operating system smartphone. Similarly, the customer 304-3 may place an order using a mobile device 358-2. One or both of the mobile devices 358 may be present in the establishment 300 and use the wireless access point 328 to obtain Internet access. In other implementations, one or both of the mobile devices 358 may connect to the distributed communications system 336 via another path, such as a different wireless local area network or a cellular network.

The orders are received and managed by the ordering system 324. In various implementations, the ordering system 324 may assign an order to either the food creation robot 308-1 or the food creation robot 308-2 depending on availability of ingredients and timing. In various implementations, a remote server (see FIG. 3) may assign orders originating outside of the establishment 300 to a selected establishment that can provide a customer's precise order. Once the order has been assigned to the establishment 300, the ordering system 324 may then decide which of the food creation robots 308 will receive the order.

A status display system 362 includes a visual display, such as a liquid crystal display (LCD) screen, and a control module to drive the display as described in more detail below. FIGS. 7A-14D depict ornamental designs and animations that can be shown on the display.

When placing an order using the mobile device 358-1, the customer 304-2 may use a website for the establishment 300. Meanwhile, the customer 304-3 may have downloaded an ordering application to the mobile device 358-2, such as from the Apple App Store digital distribution platform or the Google Play Store digital distribution platform. The ornamental design produced on the mobile device 358-1 using a web application or on the mobile device 358-2 using a native application may include ornamental designs as shown below in FIGS. 15A-18F.

In FIGS. 7A-7G, a front view of a portion of a display screen with an animated graphical user interface is shown. An order for a customer named Mary is indicated by three shapes. In FIG. 7A, these shapes are circles, although other shapes, such as squares, triangles, squares, pentagons, etc. may be used. The shapes are not limited to polygons and may include other shapes such as the stylized outline of a hamburger or a five-pointed star. In FIG. 7A, the three circles correspond to three ingredients of a menu item, such as a hamburger. For example, the first circle may correspond to the bun, the second circle may correspond to ketchup, and the third circle may correspond to a hamburger patty.

The three white circles in FIG. 7A may be white or another neutral color, such as gray, to indicate that they are still awaiting fulfillment. In FIG. 7B, the first white circle is covered by a colored circle indicating that that corresponding ingredient of the food item has been placed. For example, the bun may have been placed in a food carrier, such as a clamshell. When the next ingredient, such as ketchup, is added to the food item, an animation shown in FIG. 7B-7G shows a second colored circle rolling into place to cover the second white circle. The second colored circle is shown with diagonal hatching—however, this is simply shown to differentiate it from the first circle shown in black. The first and second circles may be the same color. Each of these circles may be a single solid color or may have a patterned fill. One or both of the circles may be split down the middle to create two semicircles, each of which is filled with a different solid color. In various implementations, each possible ingredient loaded into the food creation robots 308 may correspond to a specific color. This color may not be unique—in other words, a single color or design may be used for more than one ingredient.

In FIGS. 8A-8G, a similar animation to that of FIG. 7A-7G is shown. In FIGS. 8A-8G, the second circle appears in front of the first circle instead of rolling out from behind the first circle.

Figure 8A:
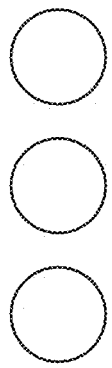
FIG. 8A-8G are front views of a graphical user interface for a display screen or portion thereof.
Figure 8B:
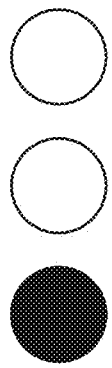
Figure 8C:
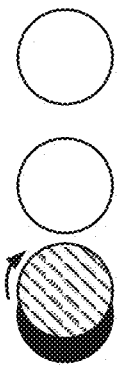
Figure 8D:
Figure 8E:
Figure 8F:
Figure 8G:
Figure 9A:
FIG. 9A-9G are front views of a graphical user interface for a display screen or portion thereof.
Figure 9B:
Figure 9C:
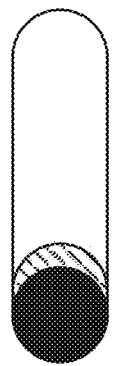
Figure 9D:
Figure 9E:
Figure 9F:
Figure 9G:
Figure 12A:
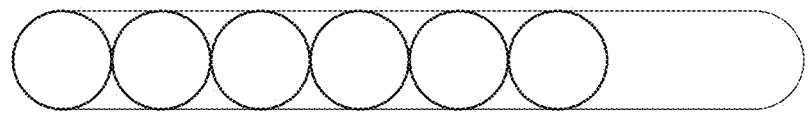
FIG. 12A-12D are front views of a graphical user interface for a display screen or portion thereof.
Figure 12B:
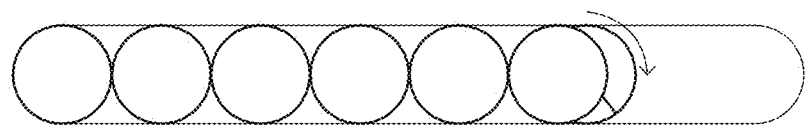
Figure 12C:
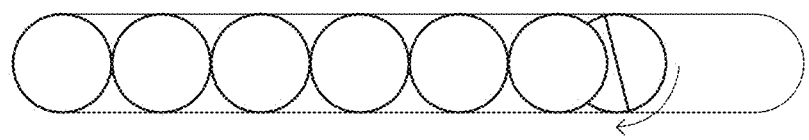
Figure 12D:
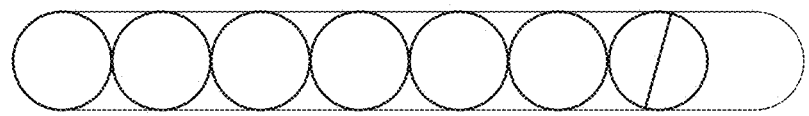

In FIGS. 9A-9G, an alternative to the empty circles of FIG. 7A and FIG. 8A is shown. In FIG. 9A, the circles are replaced by a rounded rectangle. In various implementations, the length of the rounded rectangle may be the same as the distance from the first white circle to the last white circle of FIG. 7A. In other words, while the number of circles in FIG. 7A and FIG. 8A indicates the number of ingredients in a food item, the length of the rounded rectangle in FIG. 9A indicates the number of food items. In FIGS. 9B-9G, the second circle rolls out from behind the first circle into the middle of the rounded rectangle. In other words, the ending locations of the first and second circles may be identical to that of FIG. 7G and FIG. 8G, but the final empty circle of FIG. 7G is replaced by the rounded rectangle indicating that there is still an ingredient left to fulfill.

While the black circle and the hashed circle are represented differently, this is not to disclaim the possibility that both circles will be identically colored. However, showing both circles having identical coloring would make it more difficult to picture the animation. In other words, the ornamental design relies on the fact that the second circle rolls into place but does not require that the second circle be differently colored from the first circle. In addition, the name Mary does not form any part of the ornamental design, as the name may be replaced by whoever has placed the order.

In FIG. 10, two different food item orders are shown. A nine-ingredient food item is shown to be ready for pickup. Meanwhile, a seven-ingredient food item is shown to be still in progress, as indicated by the vacancy in the rounded rectangle, which has space for three additional circles. As shown in FIG. 10, the rounded rectangle may disappear once the order is ready for pickup, leaving behind only the completed circles. In addition, in FIG. 10, three of the circles are shown to have differently-colored hemispheres. A certain pairing of colored hemispheres may correspond to a specific one or more ingredients.

In FIG. 11, the same orders as in FIG. 10 are shown, but with a different ornamental design. Specifically, the in-progress order includes three empty circles on the right, indicated by a finer line weight. These empty circles may be colored white or some other neutral color, such as gray, to indicate that they remain unfulfilled in the food item. Meanwhile, the first four circles, indicated with a heavier line weight, may be colored in more darkly than the three empty circles on the right to indicate that the first four ingredients are fulfilled in the food item. The ready for pickup and in-progress text in both FIGS. 10 and 11 is not part of the ornamental design and can be shown in phantom.

FIGS. 12A-12D depict an animation of a seventh circle appearing and rotating into place to indicate that the seventh ingredient has been added to the food item. As indicated by the size of the rounded rectangle, an eighth ingredient is necessary before the food item is complete. Although the seventh circle is shown bisected into two hemispheres, which may be colored differently, this bisection is simply for the purposes of demonstrating the animation. The bisection can therefore be shown in phantom and the circle rolling into place may have any uniform or non-uniform fill.

Figure 13A:
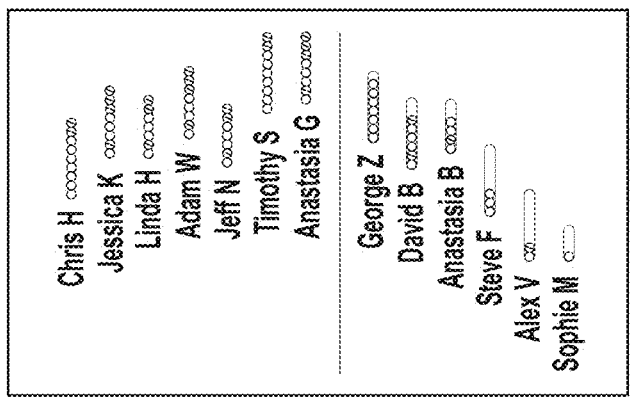
FIG. 13A-13D are front views of a graphical user interface for a display screen or portion thereof.
Figure 13B:
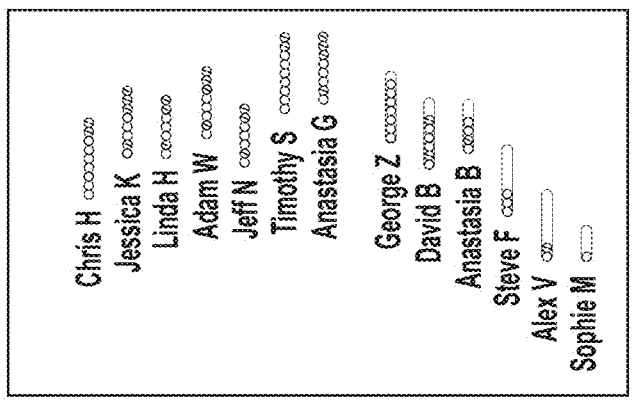
Figure 13C:
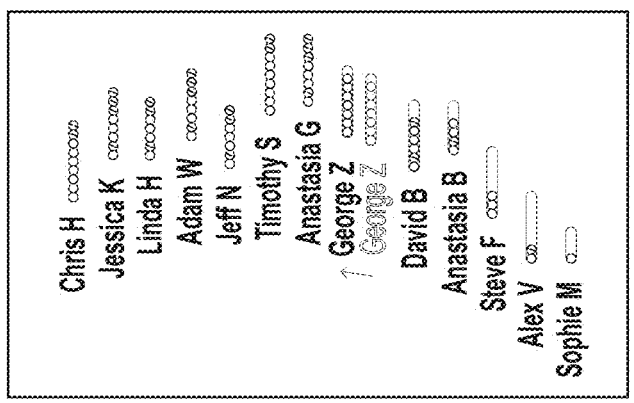
Figure 13D:
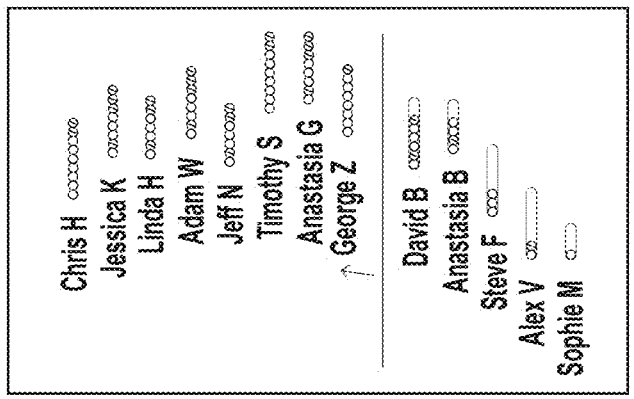

In FIGS. 13A-13D, an example leaderboard display for the status display system 362 is presented. In FIG. 13A, a circular arc of names and corresponding orders (which may be ornamentally represented as described above) is displayed. A horizontal line indicates the break between fulfilled (completed) orders and pending orders. FIGS. 13A-13D depict an animation in response to an order being completed. In this example, the order of George Z is completed. The animation shows in FIG. 13B the removal of the horizontal line, in FIG. 13C the movement of George Z and his corresponding order up along the arc, and in FIG. 13D the redrawing of the horizontal line below George Z. In FIGS. 13C and 13D, an arrow (which can be shown in phantom) indicates the movement of George Z in an angular manner along the curve of the arc. In FIG. 13C, the prior position of George Z is shown in outline to convey the sense of movement. The specific names and specific orders for each of the customers can be shown in phantom, while the shape of the text on an arc, the removal and reinsertion of the horizontal line, and the movement of text from below the line to the above the line forms the ornamental design.

Figure 14D:
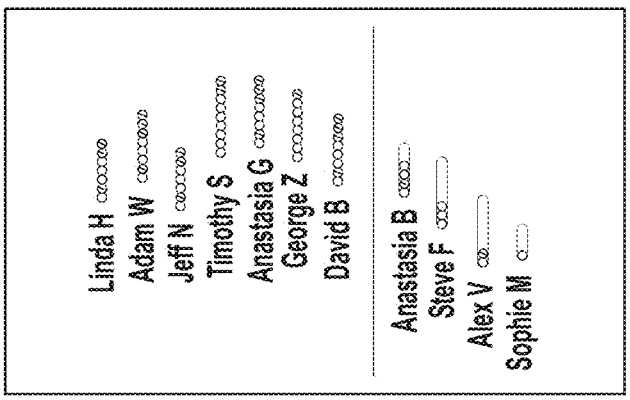
FIG. 14A-14D are front views of a graphical user interface for a display screen or portion thereof.
Figure 14C:
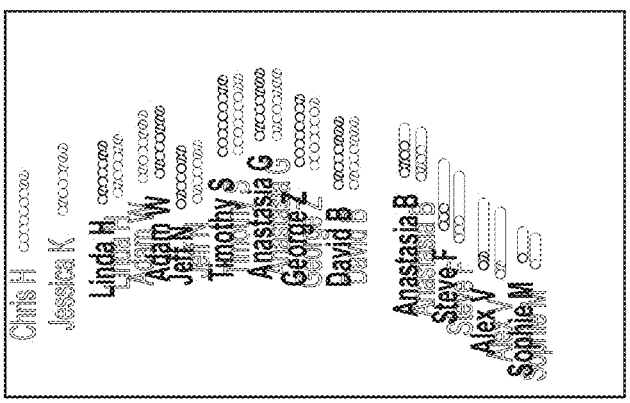
Figure 14B:
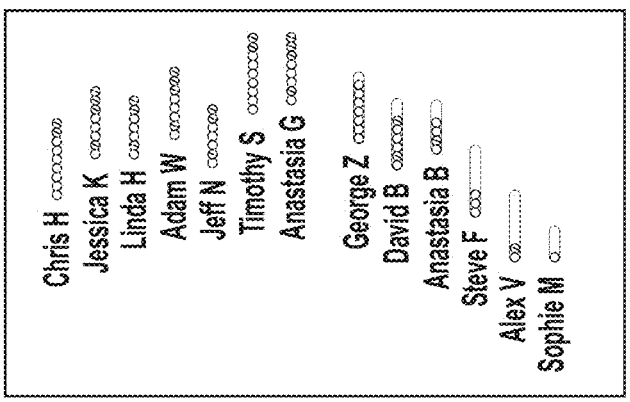

In FIGS. 14A-14D, the removal of completed orders after a period of time is shown. The period of time may be fixed or may be based on how many orders are in the queue. For example, during a slow time at the establishment 300, the removal of the names from the leaderboard may be performed after a greater delay. FIGS. 14A-14D depict an animation where the orders of two customers are removed from the completed list and the orders of two other customers move from being in progress to being in the completed list. In FIG. 14B, the horizontal line disappears. In FIG. 14C, all of the names move up along the circular arc. The two names removed from the list, Chris H and Jessica K, either slide off the top of the display or fade into the background color of the display. In FIG. 14D, the horizontal line is redrawn between completed orders, including those of David B and George Z, and in-progress orders, including Anastasia B.

Figure 14A:
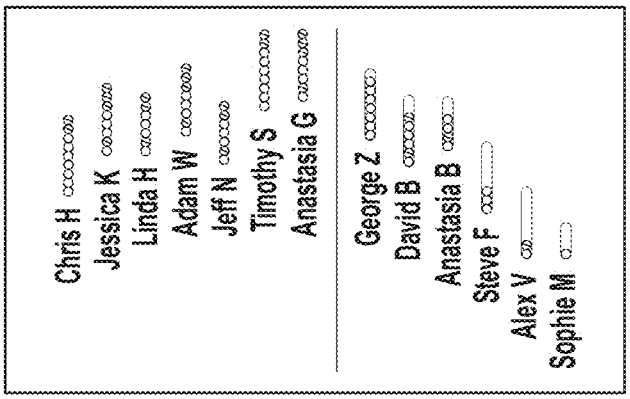

In various implementations, the left edges of the names in FIG. 14D may follow the same circular arc as is shown clearly in FIG. 14A and FIG. 14B. In other words, the left edges of the names in FIG. 14D, which do not follow a circular arc, may instead be aligned along the circular arc of FIGS. 13A-14B. Similarly, in FIG. 14C, the location of George Z may be moved to more closely follow the shape of the arc.

Figure 15A:
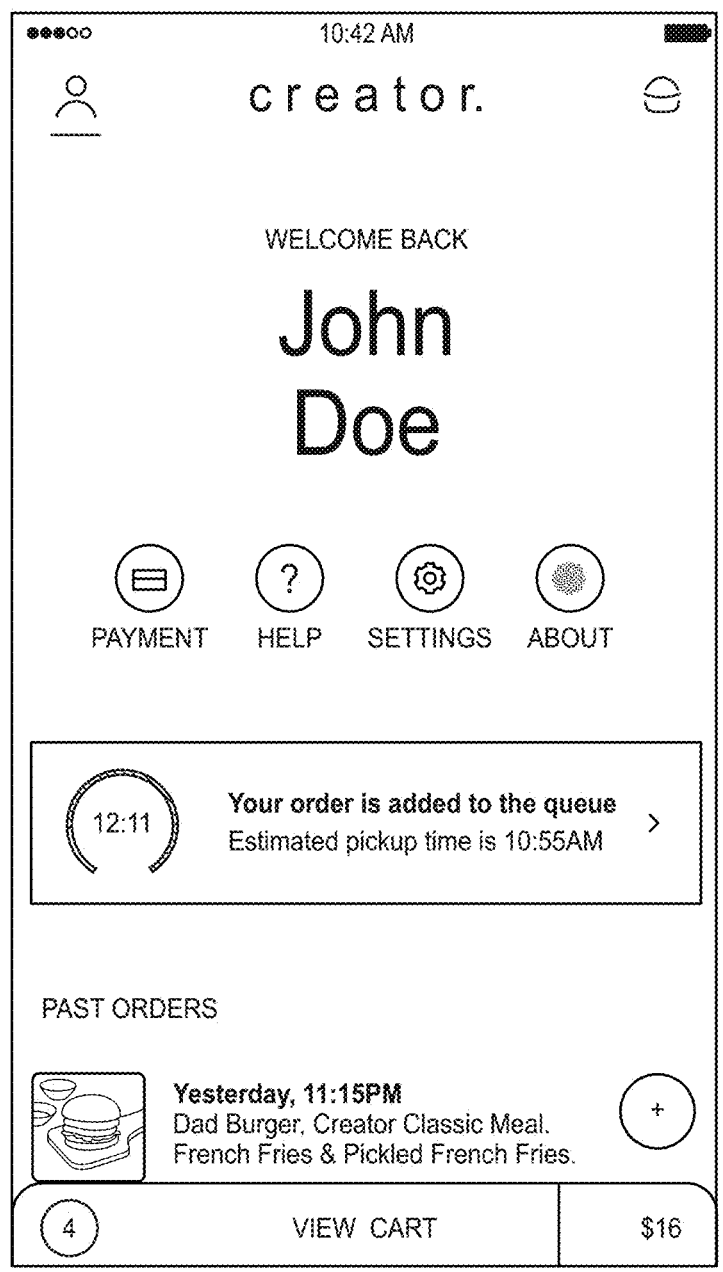
FIG. 15A is a front view of a graphical user interface for a display screen or portion thereof.

In FIG. 15A, an example display screen, such as for the mobile device 358-2, is shown with an ornamental design for a user interface. In one example ornamental design, everything would be shown in phantom except for the text 12:11, which indicates the amount of time remaining before the order is ready, along with the circle sector surrounding the text 12:11. As seen in more detail in FIGS. 15B and 15C, the circle sector includes a portion that is one color and a second portion that is a second color. As more and more of the circle sector becomes the first color, the time counts down. Therefore, the circle sector is a visual indication corresponding to the textual indication of order progress. In another ornamental design, everything is shown in phantom except the circle sector, the text 12:11, and the text indicating that "Estimated pickup time is." The specific time of 10:55 AM will vary and therefore does not form part of the design. In another ornamental design, everything in FIG. 15A would be shown in phantom except for the arrangement of the payment, help, settings, and about text and corresponding icons. In another example ornamental design, everything is shown in phantom except for the text "creator," the circle and circle sector to the left of "creator," and the hamburger icon to the right of "creator."

Figure 15B:
FIG. 15B-15C are front views of a graphical user interface for a display screen or portion thereof.
Figure 15C:
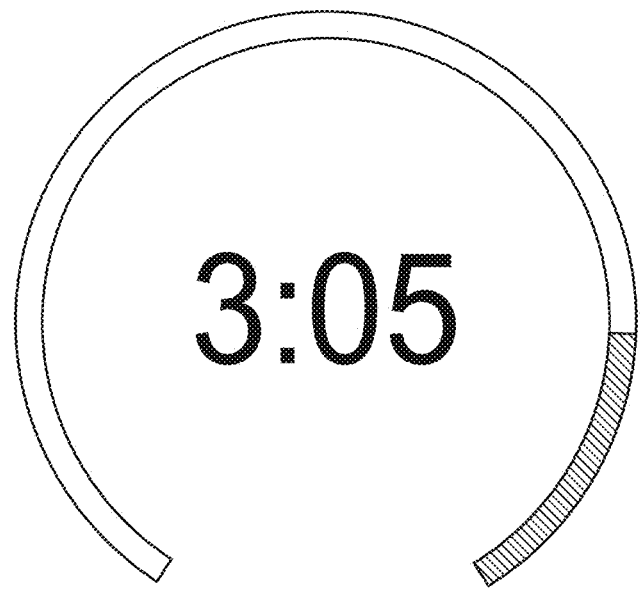

In FIG. 15B, an enlarged view of the text 12:11 and surrounding circle sector shown in FIG. 14A is presented. A first color is indicated by an empty fill, while a second color is indicated by a diagonal hatch fill. These colors may be complementary colors, completely different colors, or may be variants of each other. For example, the hue and saturation may be the same, while the lightness or value differs. As the amount of the first color increases, the waiting time decreases because the order is closer to completion. This is shown in FIG. 15C, where the time to completion of the order has been reduced to three minutes and five seconds, and the amount of the second color in the circle sector has been correspondingly reduced. The animation shown in FIGS. 15B-15C form an ornamental design where the actual text may be shown in phantom or replaced with the word "text" as a placeholder.

Figure 16A:
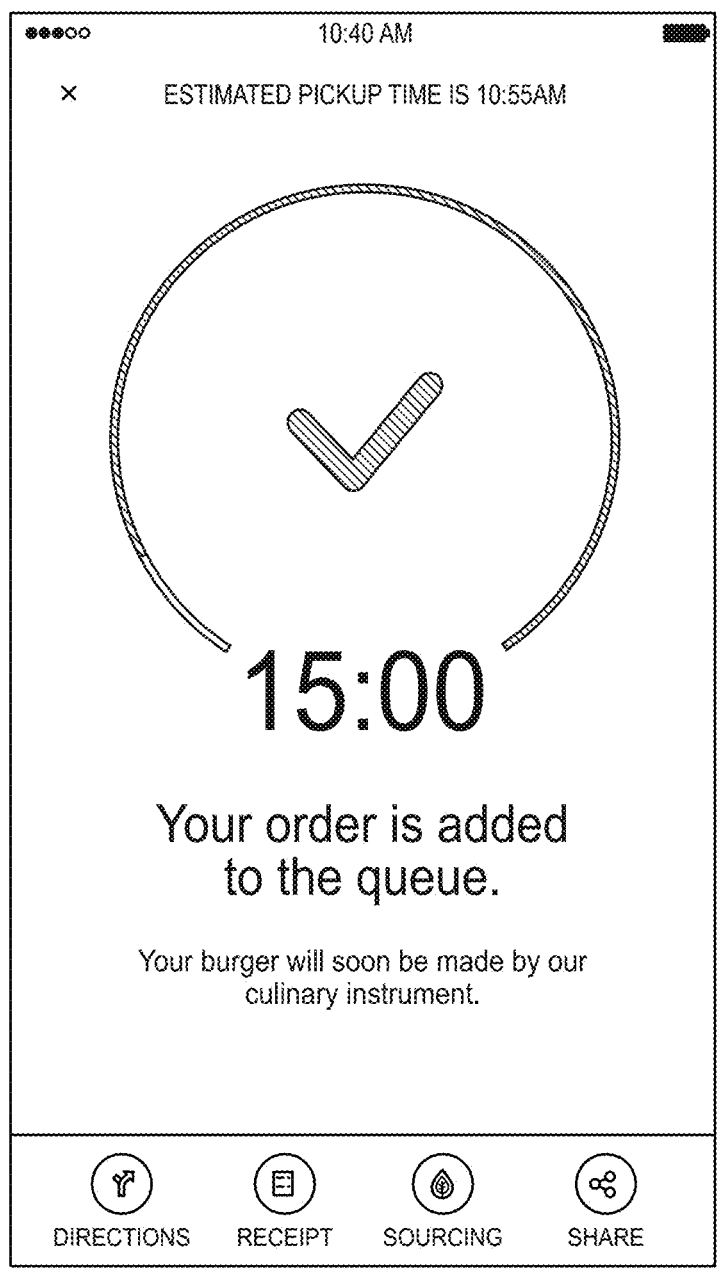
FIG. 16A-16G are front views of a graphical user interface for a display screen or portion thereof.

In FIG. 16A, another ornamental design for a display screen is shown. For example, one ornamental design may show everything in phantom except for the text directions, receipt, sourcing, and share, along with the corresponding four circled icons. In another ornamental design, everything is shown in phantom except for the text 15:00 and the circle sector beginning and ending at that text. In yet another ornamental design, everything is shown in phantom except for the 15:00 text, the circle sector, and the checkmark within the circle sector. In yet another ornamental design, the only items not shown in phantom are the circle sector, the check mark, and the text "Your order is added to the queue."

In various implementations, the coloring of the checkmark may be the same as the coloring of the second color of the circle sector. The first color of the circle sector is indicated by an empty fill, while the second color is indicated by a diagonal hatching. In other implementations, the color of the checkmark may instead match the first color of the circle sector. In various implementations, the text 15:00 may be shown in phantom or may be replaced by the word "text" to indicate that the time itself does not form part of the ornamental design.

An ornamental design with an animation is depicted from FIGS. 16A-16F. In this animation, the portion of the circle sector that has the first color (indicated by the empty fill) increases from FIGS. 16A-16F. In another ornamental design, the animation of FIGS. 16A-16F is completed by the ornamental design of FIG. 16G, which is an ornamental image indicating that a hamburger is ready for pickup. As an example, the animation may be depicted by representing everything from FIG. 16A-FIG. 16F in phantom except for the circle sector. In another ornamental design, everything from FIG. 16A-16F is represented in phantom except for the circle sector and the textual time.

Figure 16B:
Figure 16C:
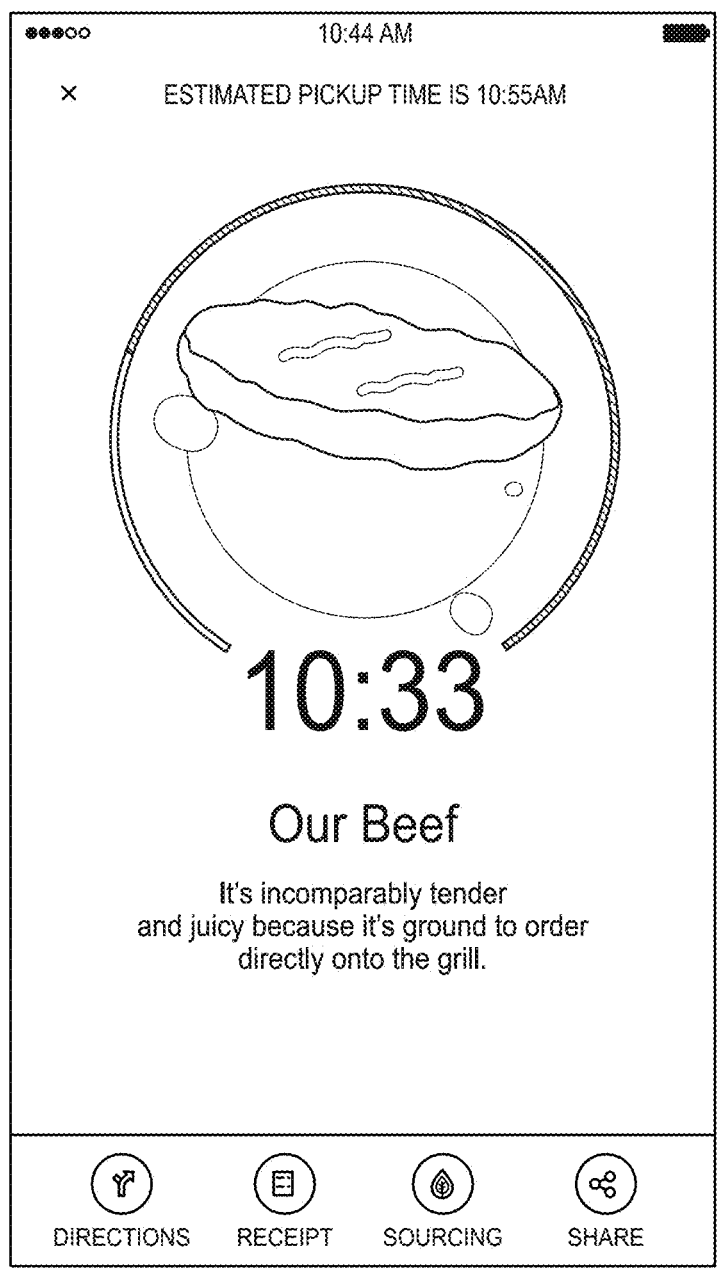
Figure 16D:
Figure 16E:
Figure 16F:
Figure 16G:
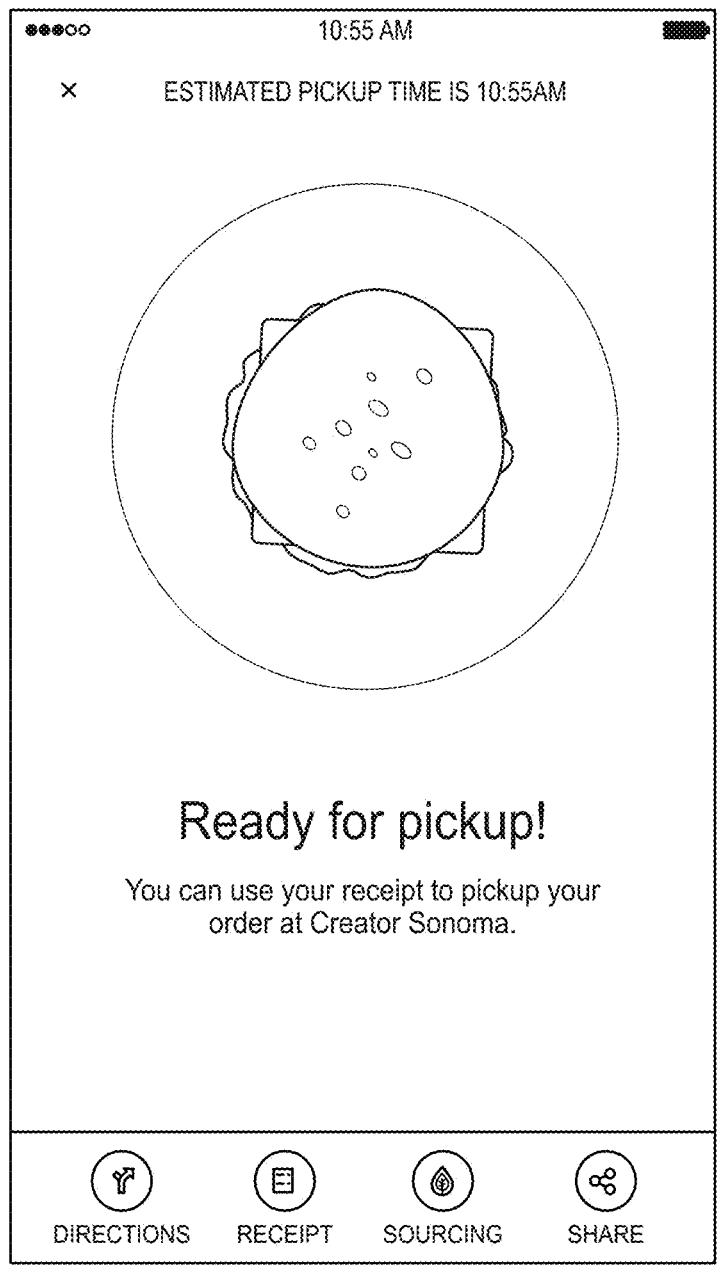

FIG. 16B constitutes a static ornamental design with everything shown in phantom except for the circle sector and the bun halves within the circle sector. FIG. 16C may be a static ornamental design where everything is shown in phantom except for the circle sector and the beef patty within the circle sector. FIG. 16D may be a static ornamental design in which everything is shown in phantom except for the circle sector and the ornamental sauce representation. FIG. 16E may be a static ornamental design in which everything is shown in phantom except for the circle sector and the two tomato slices, the lettuce leaf, and the onion slice. In the static ornamental designs of FIGS. 16B-16E, the circle sector may be shown without differentiating between the two colors because the exact time at which the corresponding image is presented may not align with the proportion of first and second colors in the circle sector.

Figure 17A:
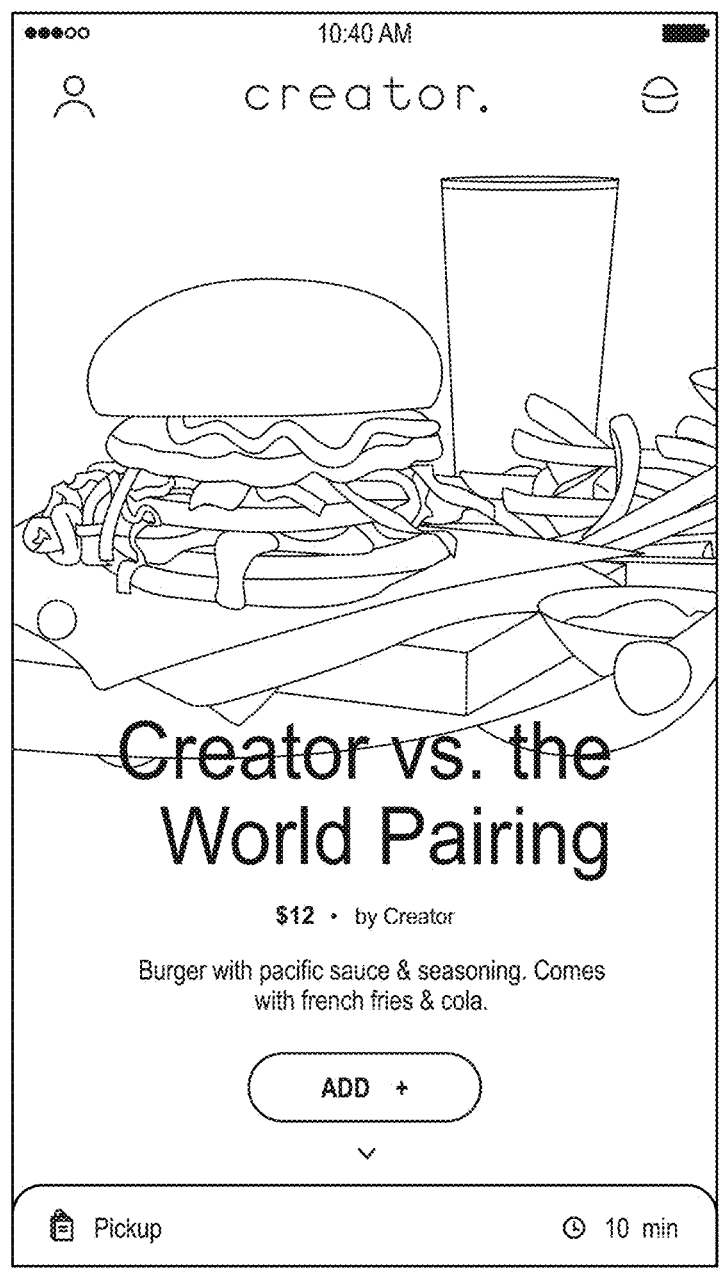
FIG. 17A-17I are front views of a graphical user interface for a display screen or portion thereof.
Figure 17B:
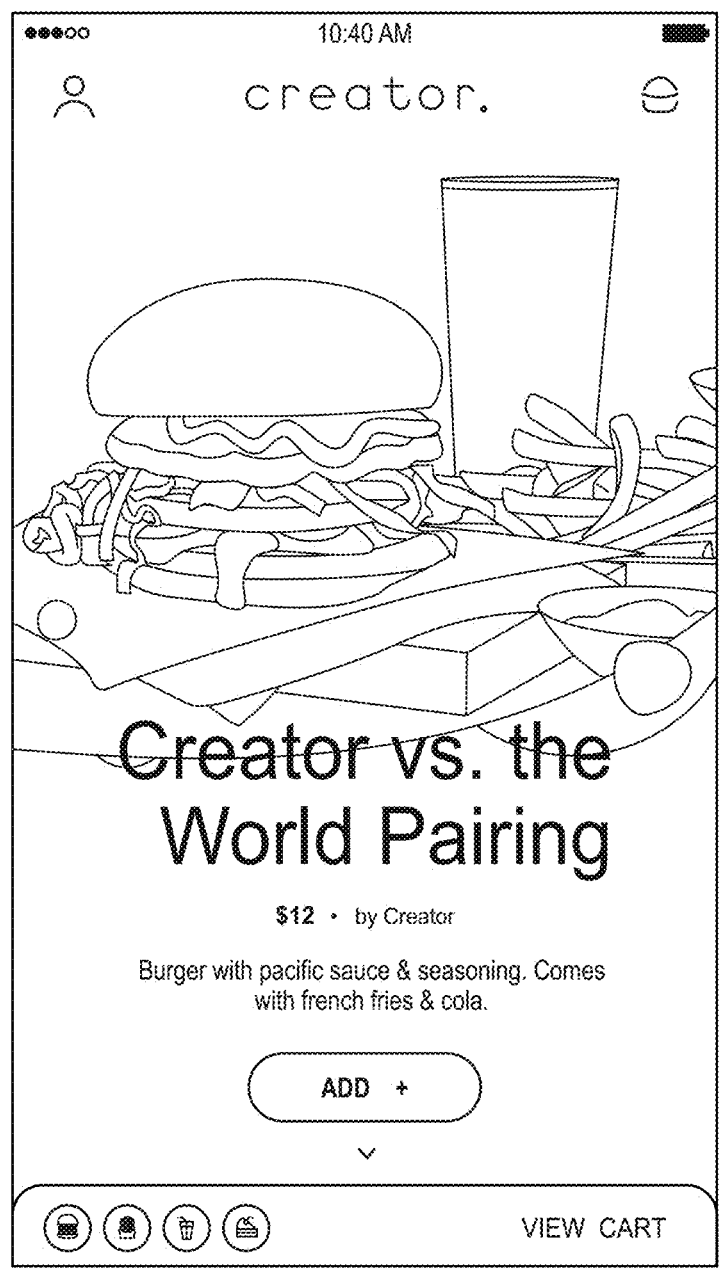

In FIG. 17A, an example pairing of burger, French fries, and soda is graphically depicted. A customer may add this pairing to their cart for ordering by selecting (such as with their finger) the ADD button. Upon selecting the ADD button, on ornamental animation shown in FIGS. 17B-17I may be initiated. In FIG. 17B, four icons are shown at the bottom of the display screen in an unselected state. The selected state may be indicated by a lack of color, by a thin line width, and/or by a lighter shading. These four icons correspond to, from left to right, a hamburger, French fries, a drink, and a dessert. The unselected icons are then graphically selected in turn to indicate which of the items are being added to the cart.

Figure 17C:
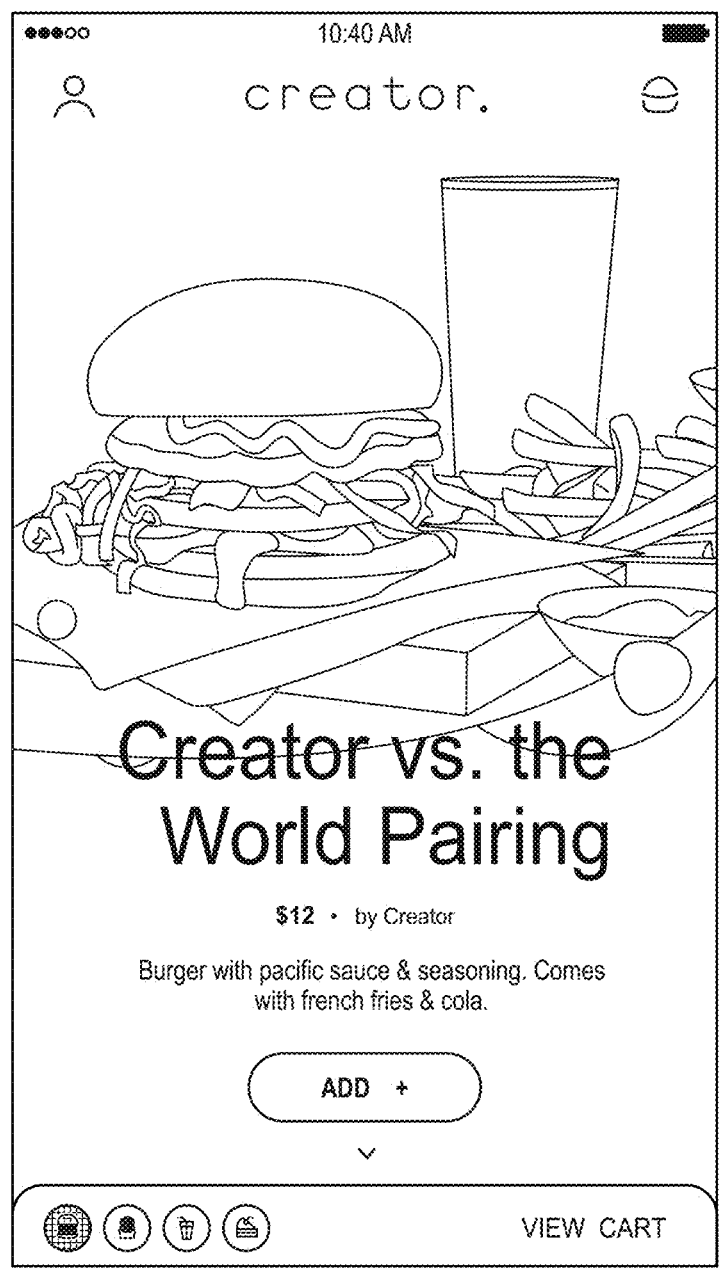
Figure 17D:
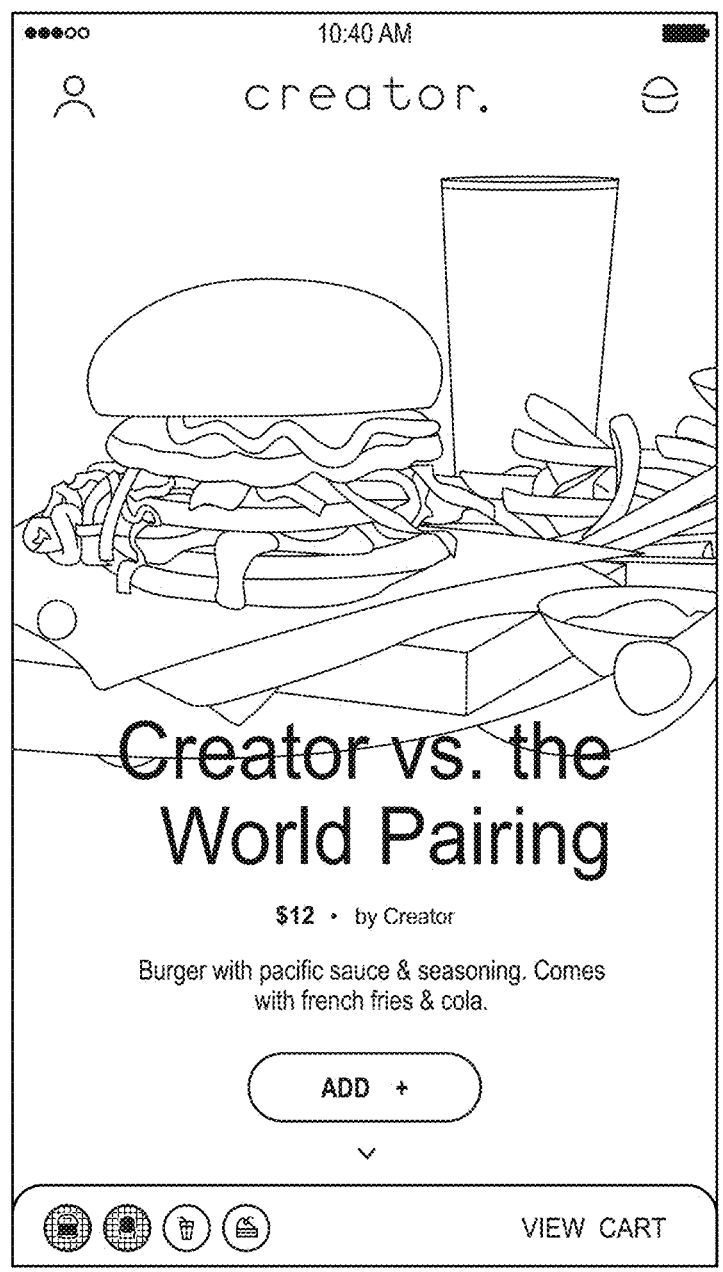
Figure 17E:
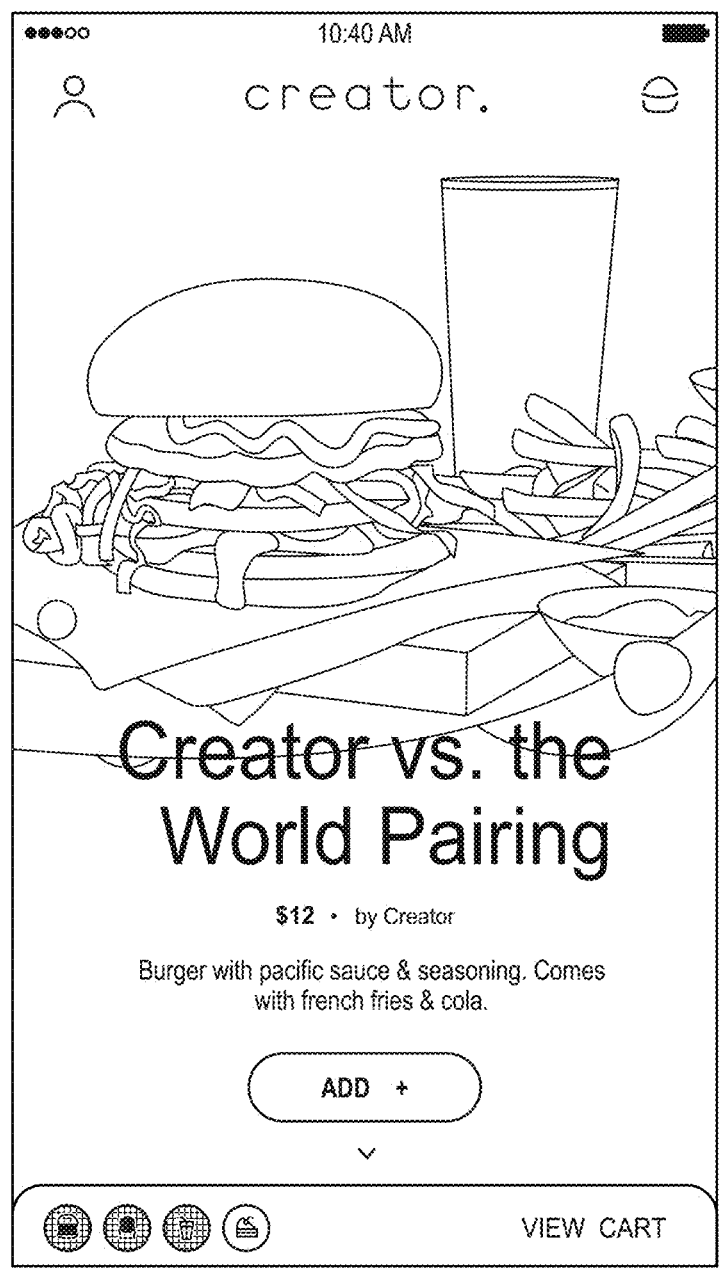

In FIG. 17C, the first icon is visually highlighted. For example, highlighting may be indicated by darkening the background fill of the icon, or choosing a darker shade for the hamburger within the icon. In another example, color may be added to the icon. Highlighting is indicated in FIG. 17C by cross-hatching. In FIG. 17D, the second icon is highlighted to indicate that French fries are being added to the cart. FIG. 17E, the third icon is highlighted to indicate that a drink is being added to the cart. Once the relevant icons are highlighted, the icons begin to collapse upon themselves as shown in FIG. 17F.

Figure 17F:
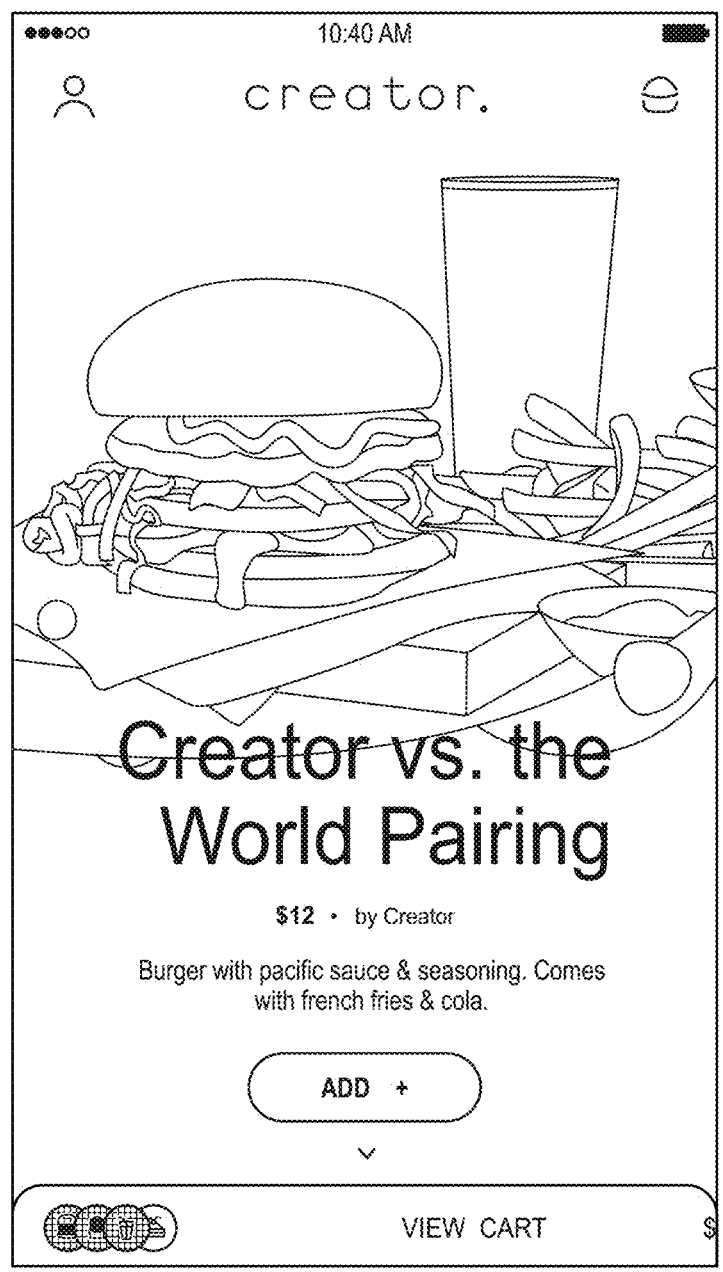
Figure 17G:
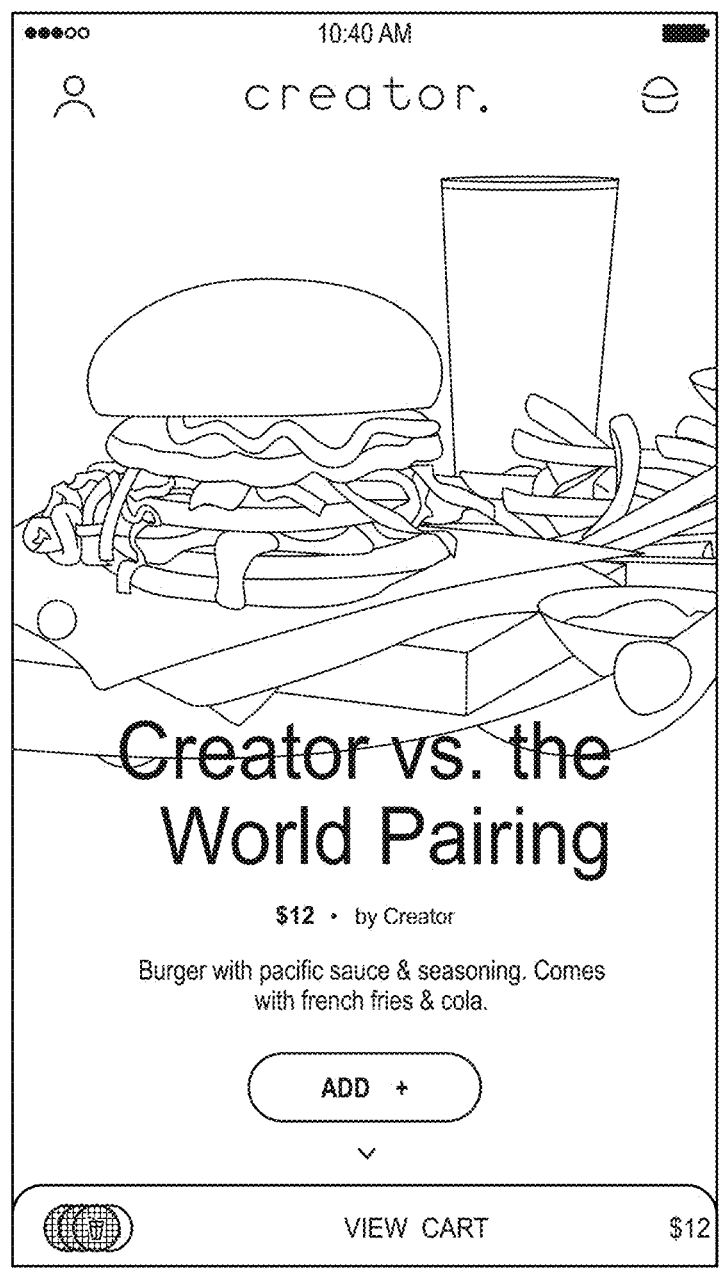
Figure 17H:
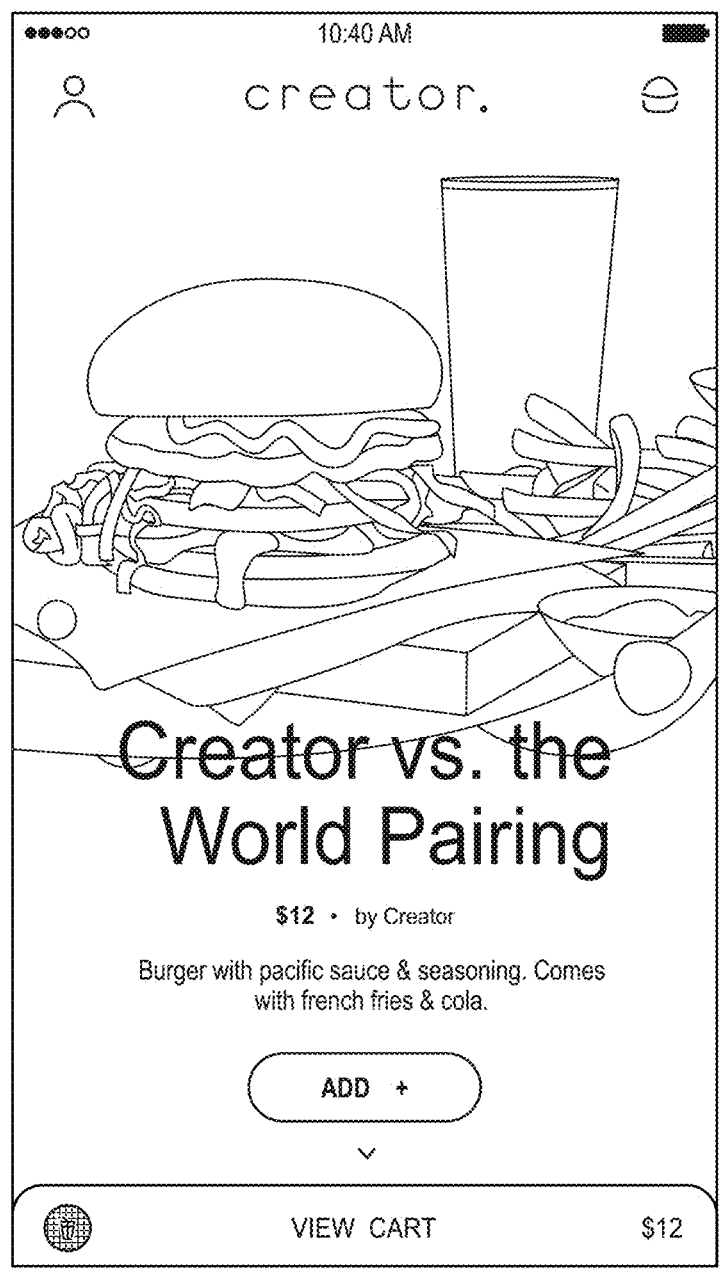

Although FIG. 17F shows the highlighted icons being in front of the unhighlighted icon, in various other implementations, the unhighlighted icon may remain in front. In FIG. 17F, highlighted icons that are more to the right are more in the foreground. However, this may be reversed so that the icons more to the left are more in the foreground. In other words, in that alternate implementation, the second icon would slide underneath the first icon and the third icon would slide underneath the second icon. In FIG. 17G, the icons continue to collapse into a single location. In FIG. 17H, the icons have fully collapsed and are located in the same location. The foreground icon may remain visible, which in this case is the third icon for a drink.

Figure 17I:
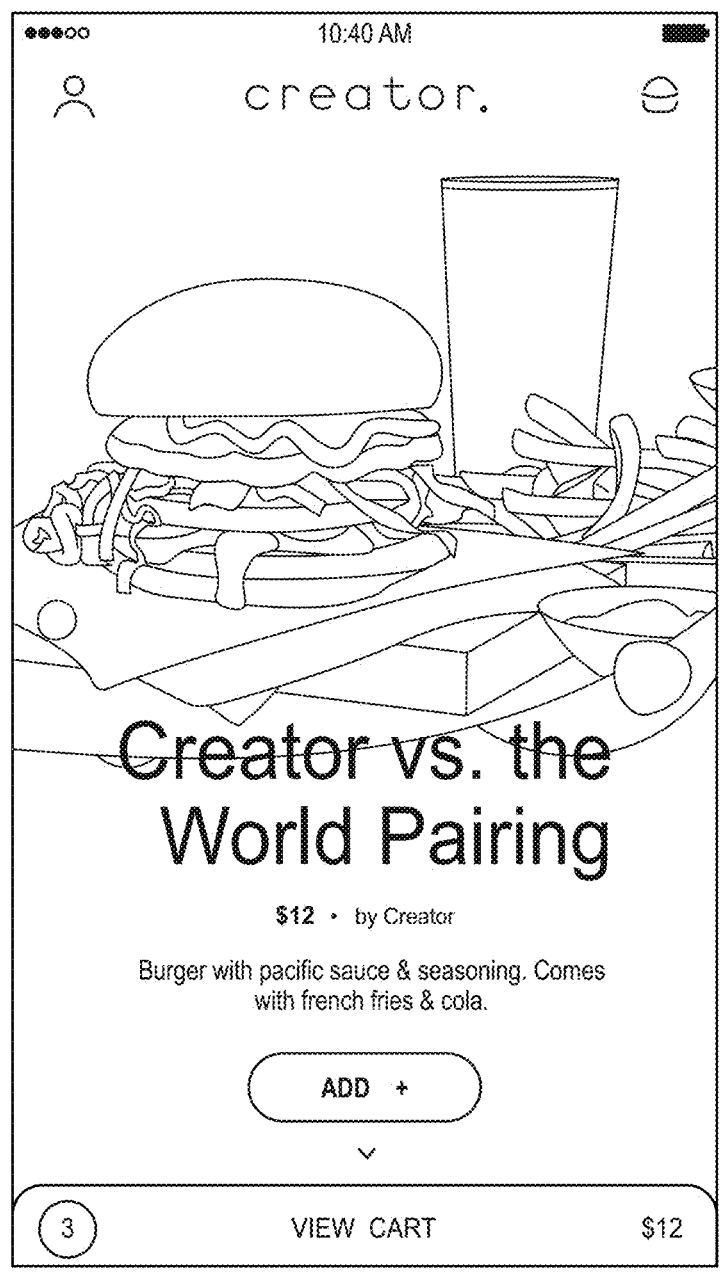

In FIG. 17I, the remaining icon is then replaced with a number indicating the number of items in the cart. Although the number three is shown in FIG. 17I, the number would be different based on the number of items that are added to the cart. In addition, if items had previously been added to the cart, the number may reflect the total number of items in the cart including the three newly added items and the prior items. The animation of FIG. 17B-17H may be represented as an ornamental design where everything in FIG. 17B-FIG. 17H is shown in phantom except for the four icons. In one example of the ornamental design, everything is shown in phantom except for the four icons in FIG. 17B-17H. However, the exact design of each icon does not form part of this ornamental animation and therefore the icon within the circle would also be shown in phantom for each of the four icons. In another example of an ornamental animation, the animation of FIG. 17B-FIG. 17H would extend to FIG. 17I, where a number replaces the icon of FIG. 17H. In other words, one ornamental animation proceeds from FIG. 17B-17H, while another ornamental animation proceeds from FIG. 17B-FIG. 17I.

Figure 18A:
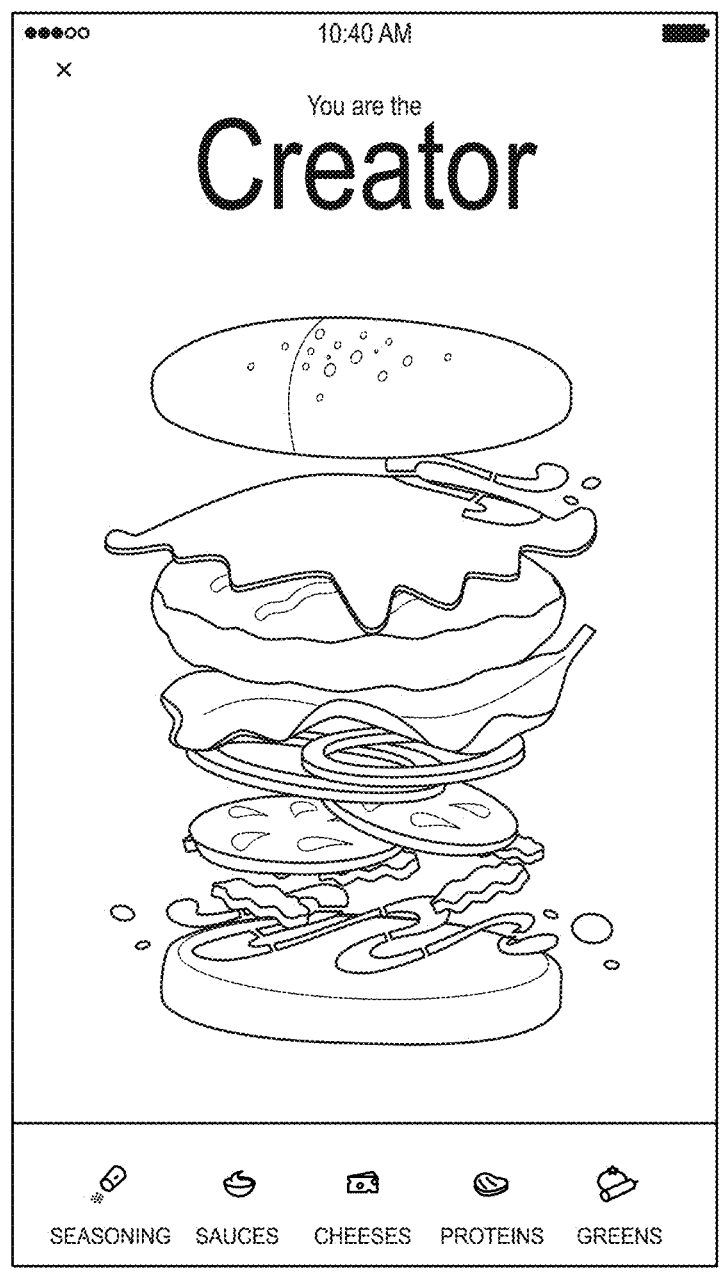
FIG. 18A-18F are front views of a graphical user interface for a display screen or portion thereof.

In FIG. 18A, another ornamental design is presented in which a customer can choose specific ingredients for their own food item, such as a hamburger. In one ornamental design, everything in FIG. 18A would be shown in phantom except for the text of seasoning, sauces, cheeses, proteins, and greens, as well as the five corresponding icons. In another ornamental design, everything in FIG. 18A would be shown in phantom except for the top and bottom bun, the top sauce, the bottom sauce, the lettuce, the onions, the tomato, the cheese, and the burger patty.

Figure 18B:
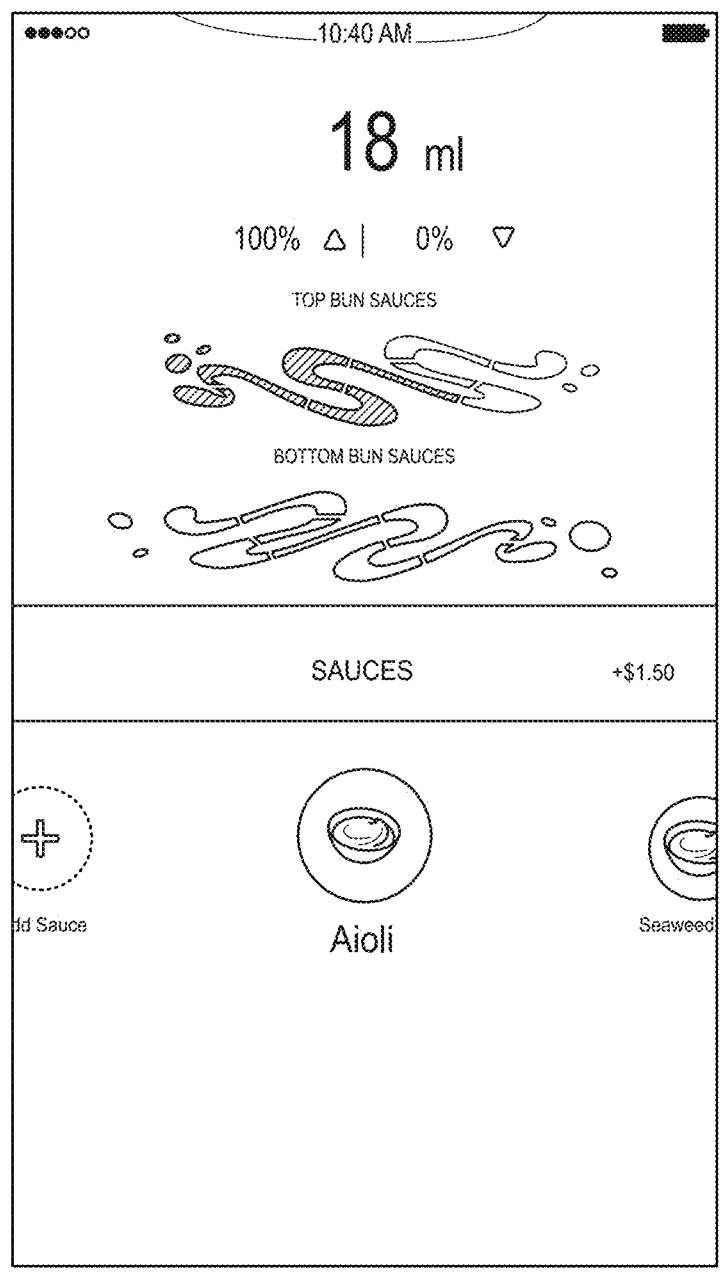
Figure 18C:
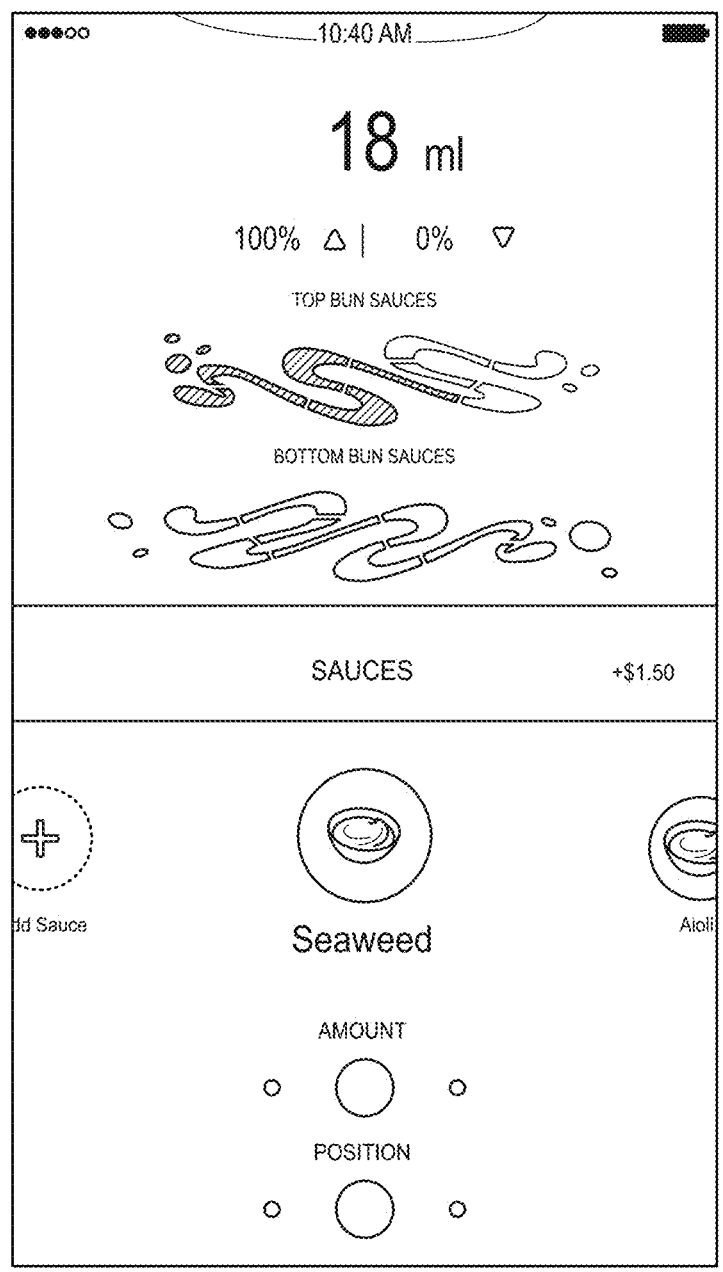

In FIG. 18B, an ornamental design may be shown in response to the user selecting the sauces button in FIG. 18A. The default sauce for this particular burger, in one example, is aioli present at a level of 18 mL. If the customer instead desires a seaweed sauce, the customer can select the button to the right of aioli to select the seaweed sauce. This results in FIG. 18C. In FIG. 18C, an ornamental design presents options for how much seaweed sauce to include and the position of the seaweed sauce. For example, the position may be adjusted between the top and bottom of the sandwich or between the left and right sides of the sandwich. For example, a customer may specify one sauce for one side and another sauce for the other side to have two different flavor profiles in the same sandwich.

In one ornamental design of FIG. 18C, everything is shown in phantom except for the word amount, the word position, and the six circles below the words amount and position. These circles indicate graphically a relative amount of the sauce and a relative position of the sauce. To reduce the amount, the user would move the large circle to the left, while to increase the amount, the user customer would move the large circle to the right. Similarly, to position the sauce more to the left of the hamburger, the customer would move the large circle below the word position to the left and similarly would move the circle to the right to adjust the position of the sauce towards the right of the sandwich.

Figure 18D:
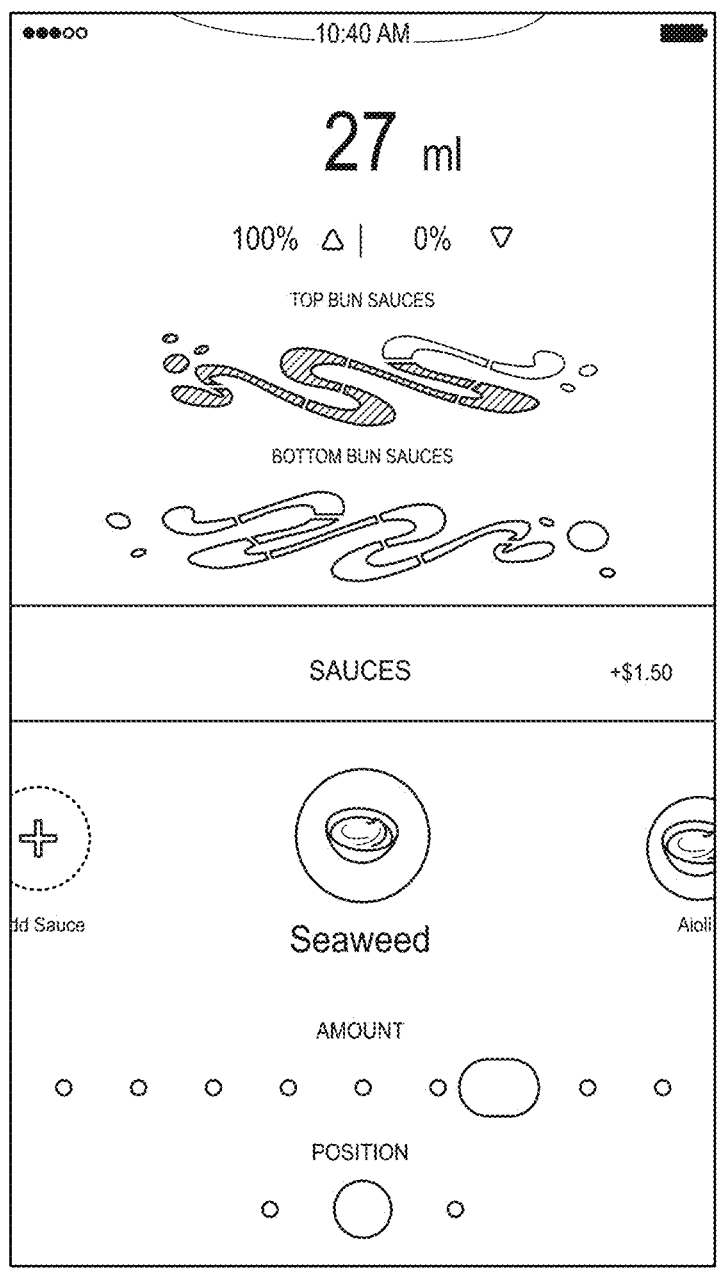

To assist the user in more finely controlling the amount of the sauce, when the user selects the amount, the circles may expand as shown in FIG. 18D. In FIG. 18D, the circles expand to fill the width of the screen and the large circle becomes oblong, allowing the customer to use the entire width of the display screen to finely adjust the amount of sauce. In FIG. 18D, the amount of sauce has been increased, as indicated by the numeric amount of 27 mL. In addition, the graphical sauce representation underneath "top bun sauces" is more fully shaded. This indicates the presence of additional sauce. The graphical sauce representation may be formed from two colors, with the first color indicated by hashing and a second color indicated by no fill. As the customer moves the oblong circle back and forth underneath the amount text, the numeric amount of the sauce varies as does the amount of the graphical sauce representation that is filled in with the first color.

Figure 18E:
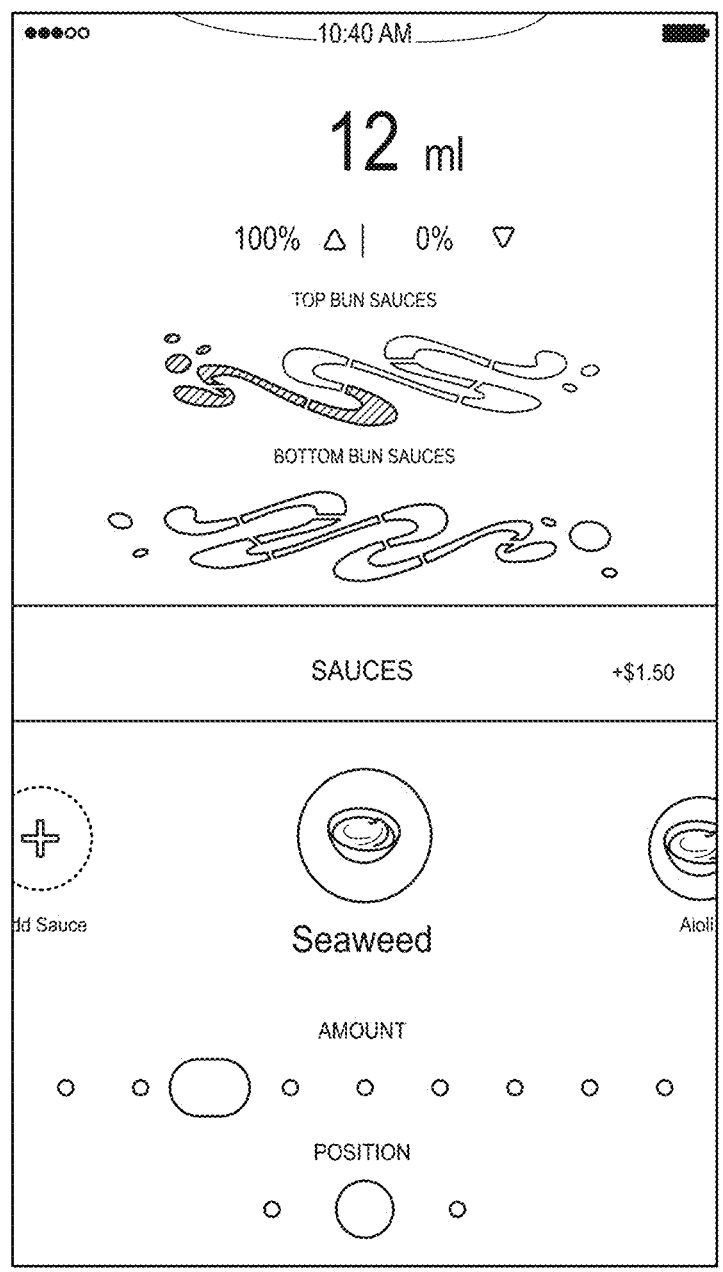
Figure 18F:
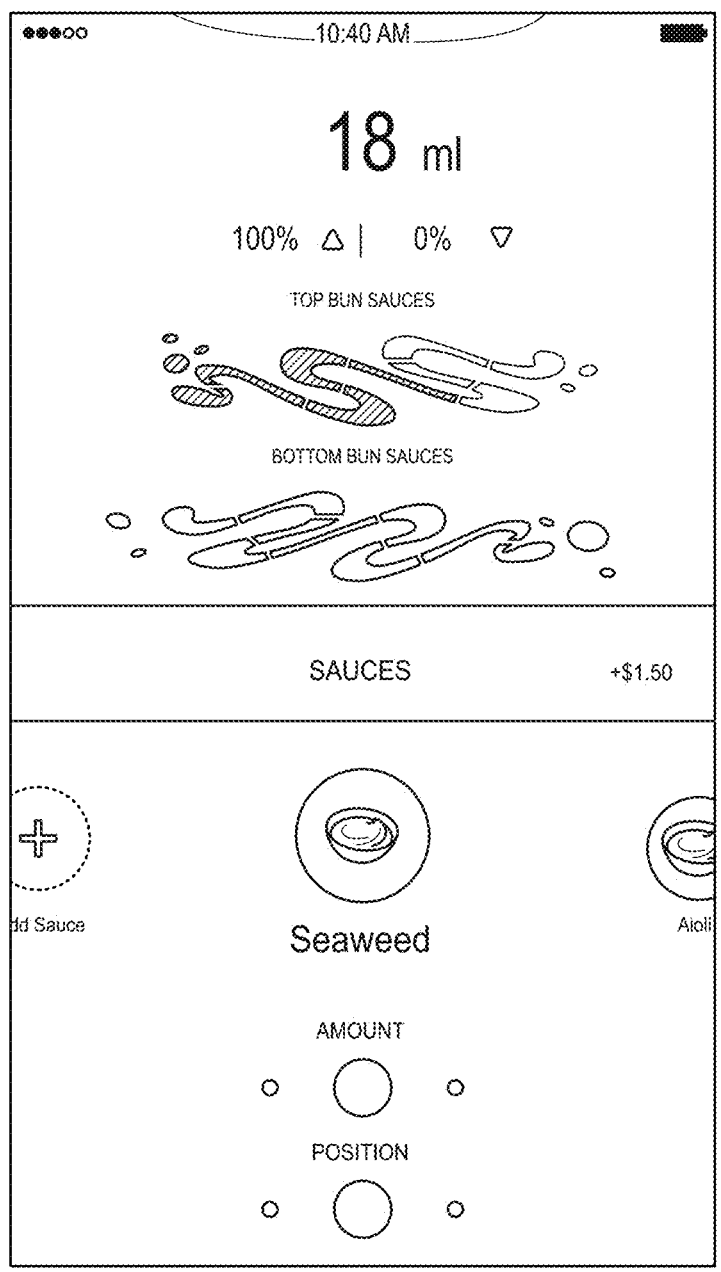

In FIG. 18E, the customer has moved the oblong circle to the left to decrease the amount and therefore the amount of the graphical sauce representation that is shown in the first color has been reduced. In addition, the numeric readout has been reduced to 12 mL. Once the customer releases the amount slider, such as by lifting their finger from the display screen, the circles collapse back and the amount is indicated on a smaller scale. If FIG. 18F, the amount has been returned to the center and the additional small circles are now collapsed. The central amount corresponds to 18 mL.

Figure 19A:
FIG. 19A-19D are front views of a graphical user interface for a display screen or portion thereof.
Figure 19B:
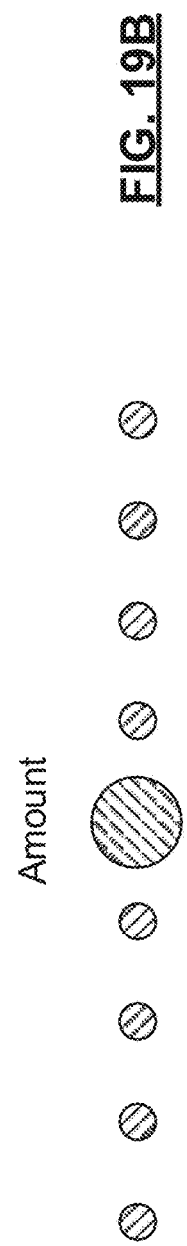

In FIGS. 19A-19D, an animation in a portion of a display screen begins at FIG. 19A. The large circle is shown with diagonal crosshatching in a first direction while the smaller circles are shown with diagonal crosshatching in a second direction. This indicates that the colors of these circles may differ. However, that is not a requirement. In other words, the color of the large circle be the same as the color of the small circles. Upon selection by the customer of the large circle in FIG. 19A, the animation proceeds to FIG. 19B, where additional small circles are displayed to provide more room for selection.

Figure 19C:
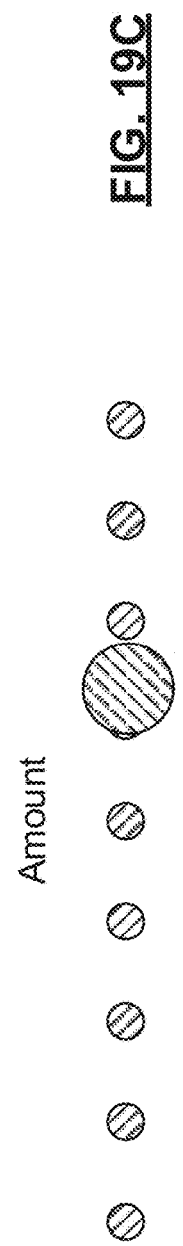
Figure 19D:
Figure 20A:
FIG. 20A-20D are front views of a graphical user interface for a display screen or portion thereof.
Figure 20B:
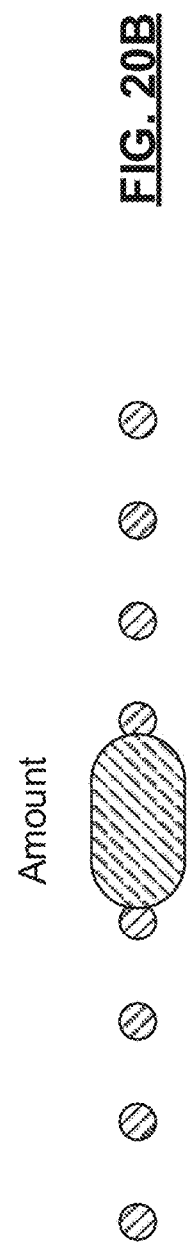
Figure 20C:
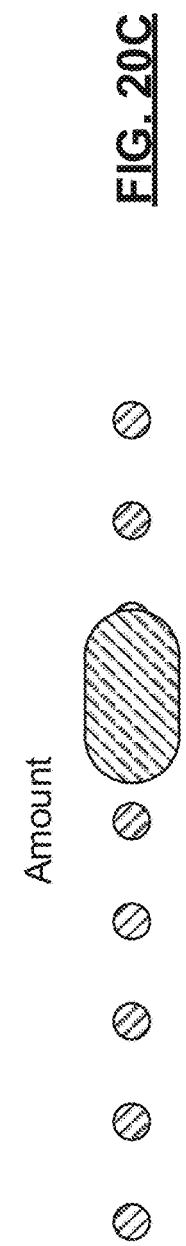
Figure 20D:

Moving the large circle to the right is depicted in FIG. 19C. When the customer then releases their finger from the large circle, FIG. 19D results, where the original set of small circles from FIG. 19A is shown, but the different amount selected in FIG. 19C is reflected by the new position of the large circle. In one example ornamental animation, the word "amount" would be shown in phantom while the circles would be shown with solid lines. In another ornamental animation, the large circle may remain in the center in FIG. 19C and therefore FIG. 19D would show the large circle still in the center. In other words, in such an ornamental animation, FIGS. 19B and 19C would be the same and FIGS. 19A and 19D would be the same.

FIGS. 20A-20D are similar to that of FIGS. 19A-19D. However, when the customer selects the large circle and the small circles expand and multiply, the large circle becomes oblong. As the customer selects a different amount in FIG. 20C, the oblong circle moves accordingly. Once the customer releases the oblong circle, the small circles collapse and the oblong circle returns to being circular in FIG. 20D. While circles are shown in FIGS. 18, 19, and 20, other shapes, such as polygons, may be used instead of circles.

Phantom text or lines, also referred to as broken lines, shown in a portion of a display screen are for illustrative purposes only and form no part of the claimed design. An animation, as described above, is a sequence of transitional images for a display screen or portion thereof. For animations, the process by which, and the period in which, one image transitions to another forms no part of the claimed ornamental design.

OVERALL

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

As used herein, the phrase at least one of A, B, and C should be construed to mean a logical (A OR B OR C), using a non-exclusive logical OR, and should not be construed to mean "at least one of A, at least one of B, and at least one of C." The term subset does not necessarily require a proper subset. In other words, a first subset of a first set may be coextensive with (equal to) the first set.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are the BLUETOOTH wireless networking standard from the Bluetooth Special Interest Group and IEEE Standard 802.15.4.

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

Some or all hardware features of a module may be defined using a language for hardware description, such as IEEE Standard 1364-2005 (commonly called "Verilog") and IEEE Standard 1076-2008 (commonly called "VHDL"). The hardware description language may be used to manufacture and/or program a hardware circuit. In some implementations, some or all features of a module may be defined by a language, such as IEEE 1666-2005 (commonly called "SystemC"), that encompasses both code, as described below, and hardware description.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A method of fulfilling custom food orders, the method comprising:
   obtaining feedback from a user through an ordering application executed on at least one of a mobile computing device, a second computing device, and a remote server, wherein the feedback relates to a first ingredient in a first food item of a first food order following fulfillment of the first food order;
   determining, using at least one of the mobile computing device, the second computing device, and the remote server, a preferred variation associated with the first ingredient based on (i) the feedback and (ii) a first recipe used to make the first food item;
   updating, using at least one of the mobile computing device, the second computing device, and the remote server, a taste profile associated with the user based on the first food order and the preferred variation associated with the first ingredient;

subsequent to obtaining the feedback, receiving, from the user through the ordering application executed on at least one of the mobile computing device, the second computing device, and the remote server, a second food order, wherein the second food order includes a second food item having the first ingredient;

retrieving, using at least one of the mobile computing device, the second computing device, and the remote server, a second recipe associated with the second food item;

in response to the second recipe including the first ingredient, selectively modifying, using at least one of the mobile computing device, the second computing device, and the remote server, the first ingredient in the second recipe based on the taste profile; and in response to the second recipe including the first ingredient, controlling a food assembly apparatus, using at least one of the mobile computing device, the second computing device, and the remote server, to prepare the second food item according to the second recipe with the first ingredient as selectively modified.

2. The method of claim 1 wherein the preferred variation represents a percentage variation in quantity of the first ingredient.

3. The method of claim 2 wherein modifying the second recipe based on the taste profile includes:
calculating a modified quantity of the first ingredient based on the taste profile and a standard quantity of the first ingredient specified by the second recipe; and
replacing the standard quantity with the modified quantity.

4. The method of claim 2 further comprising, in response to (a) the user specifying a specific amount of the first ingredient with the second food order through the ordering application in combination with (b) the second recipe including the first ingredient, controlling the food assembly apparatus, using at least one of the mobile computing device, the second computing device, and the remote server, to prepare the second food item with the specific amount of the first ingredient without modification of the second recipe based on the taste profile.

5. The method of claim 1 wherein the preferred variation represents a percentage variation in cooking time of the first ingredient.

6. The method of claim 5 wherein modifying the second recipe based on the taste profile includes:
calculating a modified cooking time of the first ingredient based on the taste profile and a standard cooking time of the first ingredient specified by the second recipe; and
replacing the standard cooking time with the modified cooking time.

7. The method of claim 1 wherein the first food item and the second food item are a same type of food item.

8. The method of claim 1 wherein:
the first food item includes a first meat patty;
the second food item includes a second meat patty; and
the first food item and the second food item are different food items.

9. The method of claim 1 wherein the updating includes, in response to the first food order being a first order ever submitted by the user, generating the taste profile for the user.

10. The method of claim 1 further comprising:
obtaining additional feedback from the user through the ordering application, wherein the additional feedback relates to the second food item following fulfillment of the second food order; and
updating the preferred variation based on the additional feedback using at least one of the mobile computing device, the second computing device, and the remote server.

11. A method of fulfilling custom food orders, the method comprising:
receiving, from a user through an ordering application executed on at least one of a mobile computing device, a second computing device, and a remote server, a first food order for a first food item including a first ingredient;

retrieving, using at least one of the mobile computing device, the second computing device, and the remote server, a first recipe associated with the first food item;

retrieving, using at least one of the mobile computing device, the second computing device, and the remote server, a set of food orders that were previously submitted by the user, wherein a food item in each food order in the set of food orders includes the first ingredient;

determining, using at least one of the mobile computing device, the second computing device, and the remote server, a preferred variation associated with the first ingredient in the set of food orders, wherein determining the preferred variation includes:
for each food order in the set of food orders, calculating a percentage variation between a requested parameter of the first ingredient and a standard parameter of the first ingredient specified by a recipe of the food item in the food order that includes the first ingredient; and
calculating an average variation of the first ingredient for the set of food orders based on the percentage variation for each food order in the set of food orders;

updating a taste profile associated with the user based on the preferred variation associated with the first ingredient using at least one of the mobile computing device, the second computing device, and the remote server;

in response to the first recipe including the first ingredient, selectively modifying the first ingredient in the first recipe based on the taste profile using at least one of the mobile computing device, the second computing device, and the remote server; and in response to the first recipe including the first ingredient, controlling a food assembly apparatus, using at least one of the mobile computing device, the second computing device, and the remote server, to prepare the first food item according to the first recipe with the first ingredient as selectively modified.

12. The method of claim 11 wherein the preferred variation represents a percentage variation in quantity of the first ingredient.

13. The method of claim 12 wherein modifying the first recipe based on the taste profile includes:
calculating a modified quantity of the first ingredient based on the taste profile and a standard quantity of the first ingredient specified by the first recipe; and
replacing the standard quantity with the modified quantity in the first recipe.

14. The method of claim 12 wherein in the preferred variation further represents a percentage variation in cooking time of the first ingredient.

15. The method of claim 14 wherein modifying the first recipe based on the taste profile includes:

calculating (i) a modified quantity of the first ingredient based on the taste profile and a standard quantity of the first ingredient specified by the first recipe and (ii) a modified cooking time of the first ingredient based on the taste profile and a standard cooking time of the first ingredient specified by the first recipe; and replacing (i) the standard quantity with the modified quantity in the first recipe and (ii) the standard cooking time with the modified cooking time.

16. The method of claim 12 further comprising, in response to (a) the user specifying a specific amount of the first ingredient with the first food order through the ordering application in combination with (b) the first recipe including the first ingredient, controlling the food assembly apparatus, using at least one of the mobile computing device, the second computing device, and the remote server, to prepare the first food item with the specific amount of the first ingredient without modification of the first recipe based on the taste profile.

17. The method of claim 11 wherein the preferred variation represents a percentage variation in cooking time of the first ingredient.

18. The method of claim 17 wherein modifying the first recipe based on the taste profile includes:

calculating a modified cooking time of the first ingredient based on the taste profile and a standard cooking time of the first ingredient specified by the first recipe; and replacing the standard cooking time with the modified cooking time.

19. The method of claim 11 wherein the retrieving is performed in response to receiving the first food order.

20. The method of claim 11 wherein the set of food orders includes at least one food item that is different from the first food item.

* * * * *

UNITED STATES PATENT AND TRADEMARK OFFICE
CERTIFICATE OF CORRECTION

| | | |
|---|---|---|
| PATENT NO. | : 11,023,949 B2 | Page 1 of 1 |
| APPLICATION NO. | : 16/013978 | |
| DATED | : June 1, 2021 | |
| INVENTOR(S) | : Paul Radcliffe et al. | |

It is certified that error appears in the above-identified patent and that said Letters Patent is hereby corrected as shown below:

On the Title Page

Item (72) Inventors, Line 5     "Alexandras" should be --Alexandros--

Signed and Sealed this
Seventeenth Day of May, 2022

Katherine Kelly Vidal
*Director of the United States Patent and Trademark Office*